(12) United States Patent
Kondo

(10) Patent No.: US 9,836,812 B2
(45) Date of Patent: Dec. 5, 2017

(54) IMAGE PROCESSING APPARATUS, METHOD, AND MEDIUM TO APPLY A RESTRICTIVE CONDITION

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 659 days.

(21) Appl. No.: 14/353,643

(22) PCT Filed: Oct. 15, 2012

(86) PCT No.: PCT/JP2012/076585
§ 371 (c)(1),
(2) Date: Apr. 23, 2014

(87) PCT Pub. No.: WO2013/061810
PCT Pub. Date: May 2, 2013

(65) Prior Publication Data
US 2014/0292762 A1 Oct. 2, 2014

(30) Foreign Application Priority Data
Oct. 26, 2011 (JP) ................................. 2011-235157

(51) Int. Cl.
*G06T 3/00* (2006.01)
*G06T 5/00* (2006.01)
*H04N 5/20* (2006.01)

(52) U.S. Cl.
CPC .......... *G06T 3/0056* (2013.01); *G06T 3/0012* (2013.01); *G06T 5/001* (2013.01);
(Continued)

(58) Field of Classification Search
CPC .................................................. G06T 2210/36
See application file for complete search history.

(56) References Cited

U.S. PATENT DOCUMENTS 8,687,918 B2 4/2014 Tamura
2004/0109004 A1* 6/2004 Bastos ................. G06T 15/405
345/587
(Continued)

FOREIGN PATENT DOCUMENTS

CN 101527773 A 9/2009
CN 101536031 A 9/2009
(Continued)

OTHER PUBLICATIONS

International Search Report dated Jan. 8, 2013, from corresponding International Application No. PCT/JP2012/076585.
(Continued)

*Primary Examiner* — Daniel Hajnik
(74) *Attorney, Agent, or Firm* — Troutman Sanders LLP

(57) ABSTRACT

An image processing apparatus includes a restrictive condition storage unit in which at least one restrictive condition, which is to be applied to an image to be output and acquired from a subject, is stored, an accepting unit that accepts an image that is obtained by shooting the subject and has at least one field, an image changing unit that applies the at least one restrictive condition to the at least one field of the image accepted by the accepting unit, changes the at least one field so that it satisfies the at least one restrictive condition, and acquires at least one new field, and an image output unit that outputs the at least one field acquired by the image changing unit, enabling an image having an overall balance to be output.

11 Claims, 18 Drawing Sheets

(52) U.S. Cl.
CPC .............. *G06T 5/002* (2013.01); *G06T 5/007* (2013.01); *H04N 5/20* (2013.01); *G06T 2207/20012* (2013.01); *G06T 2207/20228* (2013.01)

(56) References Cited

U.S. PATENT DOCUMENTS

| | | |
|---|---|---|
| 2005/0036558 A1 | 2/2005 | Dumitras et al. |
| 2005/0253843 A1* | 11/2005 | Losasso Petterson .. G06T 15/10 345/428 |
| 2006/0159368 A1* | 7/2006 | Kondo ...................... G06T 1/00 382/299 |
| 2007/0071343 A1 | 3/2007 | Zipnick et al. |
| 2009/0216458 A1* | 8/2009 | Ohto .................... C12Q 1/6816 702/19 |
| 2009/0225183 A1 | 9/2009 | Tamura |
| 2009/0324121 A1 | 12/2009 | Bhagavathy et al. |
| 2010/0208998 A1* | 8/2010 | Van Droogenbroeck ....... G06K 9/38 382/195 |
| 2011/0037877 A1 | 2/2011 | Tamaru |
| 2011/0069903 A1* | 3/2011 | Oshikiri ................. G06T 5/002 382/264 |
| 2011/0150284 A1* | 6/2011 | Son ...................... G06T 7/2026 382/103 |

FOREIGN PATENT DOCUMENTS

| | | |
|---|---|---|
| JP | 63-38381 | 2/1988 |
| JP | 8-317346 | 11/1996 |
| JP | 2825482 | 11/1998 |
| JP | 3072306 | 7/2000 |
| JP | 2009-239903 | 10/2009 |
| JP | 2010-226694 | 10/2010 |
| JP | 2011-41089 | 2/2011 |
| JP | 2011-66827 | 3/2011 |
| TW | 200845762 A | 11/2008 |

OTHER PUBLICATIONS

Extended European Search Report dated Mar. 18, 2015, issued in corresponding European Application No. 12843479.
Taiwanese Office Action dated May 26, 2016 issued in corresponding Taiwanese Patent Application No. TW101138124.
Notification of Reasons for Refusal dated Aug. 17, 2016 issued in Japanese Patent Application No. 2013-540728.
First Chinese Office Action dated Sep. 18, 2016 issued in corresponding Chinese Patent Application No. 201280050426.7.
Second Chinese Office Action dated Mar. 8, 2017 issued in corresponding Chinese Patent Application No. 201280050426.7 with English Translation.
Third Chinese Office Action dated Aug. 24, 2017 issued in corresponding Chinese Patent Application No. 201280050426.7 with English Translation.

* cited by examiner

IMAGE PROCESSING APPARATUS, METHOD, AND MEDIUM TO APPLY A RESTRICTIVE CONDITION

CROSS-REFERENCE TO RELATED APPLICATIONS

This is a U.S. national phase application under 35 U.S.C. §371 of International Patent Application No. PCT/JP2012/076585, filed on Oct. 15, 2012, and claims benefit of priority to Japanese Patent Application No. JP 2011-235157, filed on Oct. 26, 2011. The International Application was published on May 2, 2013, as International Publication No. WO 2013/061810 under PCT Article 21(2). The entire contents of these applications are hereby incorporated by reference.

TECHNICAL FIELD

The present invention relates to an image processing apparatus and the like for processing images.

BACKGROUND ART

Conventionally, there has been a digital image signal interpolation apparatus for generating, by interpolating with real input image data, image data of a particular pixel between pixels corresponding to the real input image data, the apparatus including: a part that receives the real input image data, and extracts real pixel data of a predetermined number of pixels around the particular pixel; and a part that generates pixel data of the particular pixel by interpolation using linear combination of a predetermined number of coefficients and the extracted real pixel data of the predetermined number of pixels, wherein the coefficients are acquired using pixel data for obtaining the coefficients in advance through the least squares method such that a squared-sum of errors between interpolation values and true values becomes minimum (see Patent Document 1).

Furthermore, there has been a digital video signal converting apparatus that generates, from a first digital video signal, a second digital video signal having a larger number of pixels than the first digital video signal (see Patent Document 2).

Meanwhile, in recent years, screens of television receivers and the like are getting larger. Furthermore, in recent years, multi-display (multiple screens each having a frame are combined into one screen) has advanced, and screen brightness is getting higher.

CITATION LIST

Patent Document

[Patent Document 1] Japanese Patent No. 2825482 (Page 1, FIG. 1, etc.)
[Patent Document 2] Japanese Patent No. 3072306 (Page 1, FIG. 1, etc.)

SUMMARY OF INVENTION

Technical Problem

However, the conventional image processing apparatuses sometimes output an image that is out of balance on the whole.

In the case of a large screen, a viewer has to follow an object in the screen with his or her eyes, and does not feel a sense of perspective or a sense of depth if the screen outputs an image that is out of balance on the whole, such as, for example, an image in which an object that actually exists in the back has a high brightness and an object that actually exists in the front has a low brightness. Furthermore, if, in a large screen, for example, an object has an unnatural brightness distribution and is out of balance on the whole, it is difficult for a viewer to perceive the thickness of the object. Furthermore, if, in a large screen, for example, an object that is non-rigid body moves away from the viewer side into the background while being deformed, and this image is out of balance such that the brightness of the background of the screen is higher than that of the foreground, there is the problem that it is difficult for the viewer to perceive the deformation of the non-rigid body. Furthermore, if, in a large screen, many sunflowers are shown for example, and the sunflowers in the foreground have a weak sense of resolution and the sunflowers in the background have a strong sense of resolution, there is the problem that the viewer does not feel a sense of perspective.

These are specific examples of problems caused by a large screen outputting an image that is not in accordance with natural rules, that is, an image that is out of balance.

Solution to Problem

A first aspect of the present invention is directed to an image processing apparatus including: a restrictive condition storage unit in which at least one restrictive condition, which is to be applied to an image to be output and is acquired from a subject, can be stored; an accepting unit that accepts an image that is obtained by shooting the subject and has at least one field; an image changing unit that applies the at least one restrictive condition to the at least one field of the image accepted by the accepting unit, changes the at least one field so that the at least one field satisfies the at least one restrictive condition, and acquires at least one new field; and an image output unit that outputs the at least one field acquired by the image changing unit.

With this configuration, it is possible to output an image that is balanced on the whole.

Furthermore, a second aspect of the present invention is directed to the image processing apparatus according to the first aspect, further including, a restrictive condition acquiring unit that acquires at least one restrictive condition from the at least one field of the image accepted by the accepting unit, wherein the at least one restrictive condition of the restrictive condition storage unit is the at least one restrictive condition acquired by the restrictive condition acquiring unit.

With this configuration, it is possible to dynamically acquire a restrictive condition that is appropriate for an image to be output, to apply the acquired restrictive condition, and to output an image that is balanced on the whole.

Furthermore, a third aspect of the present invention is directed to the image processing apparatus according to the first or second aspect, wherein at least two pairs of at least one restrictive condition and a feature amount condition, which relates to a feature amount of an object in the field, are stored in the restrictive condition storage unit, and the image changing unit includes: a feature amount acquiring part that acquires at least one predetermined feature amount from the at least one field of the image accepted by the accepting unit; a restrictive condition acquiring part that determines at least one feature amount condition that matches the at least one feature amount, and acquires, from the restrictive condition storage unit, at least one restrictive condition that constitutes a pair with each of the at least one feature amount condition; and an image acquiring part that applies the at least one restrictive condition acquired by the restrictive condition acquiring part to the at least one field of the image accepted by the accepting unit, changes the at least one field so that the at least one field satisfies the at least one restrictive condition, and acquires at least one new field.

With this configuration, it is possible to dynamically select a restrictive condition that is appropriate for an image to be output, to apply the selected restrictive condition to the image, and to output an image that is balanced on the whole.

Advantageous Effects of Invention

The image processing apparatus according to the present invention can output an image that is balanced on the whole.

DESCRIPTION OF EMBODIMENTS

Figure 1:
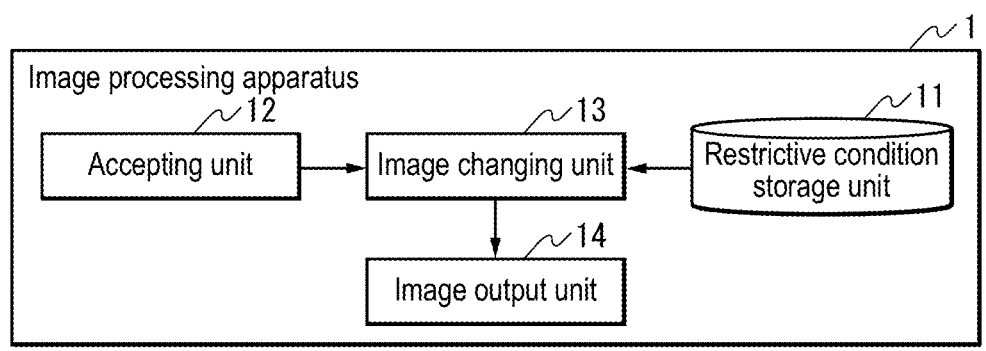
FIG. 1 is a block diagram illustrating an image processing apparatus according to Embodiment 1.

Hereinafter, embodiments of an image processing apparatus and the like will be described with reference to the drawings. Note that, in the embodiments, constituent components denoted by the same reference numerals perform the same operations, and, thus, a description thereof may not be repeated.

Embodiment 1

In this embodiment, an image processing apparatus 1 will be described that applies at least one restrictive condition, which can be acquired from a subject, to one or more images (input images) obtained by shooting the subject, processes the input images so that they satisfy the restrictive condition, and acquires an image to be output.

FIG. 1 is a block diagram of the image processing apparatus 1 according to the present embodiment. The image processing apparatus 1 is, for example, a television receiver, a DVD player, or the like.

The image processing apparatus 1 includes a restrictive condition storage unit 11, an accepting unit 12, an image changing unit 13, and an image output unit 14.

At least one restrictive condition can be stored in the restrictive condition storage unit 11. The restrictive condition refers to a condition that is to be applied to an image to be output and is acquired from a subject. The restrictive condition refers to a condition under which an image is in accordance with natural rules. Specifically, the restrictive condition is, for example, a condition for ensuring that a screen area of the foreground for the viewer has a higher brightness and a screen area of the background has a lower brightness. Furthermore, the restrictive condition is, for example, a condition for ensuring that an object in the foreground for the viewer has a strong sense of resolution and an object in the background has a poor sense of resolution. In this context, the sense of resolution refers to a feeling of a fine image, a feeling of a beautiful image, a feeling of a high quality image, a feeling of an image having less noise, a feeling of a natural image, or the like.

A sense of resolution can be determined by, for example, performing frequency analysis. Specifically, for example, frequency analysis is performed on an image or a part thereof (such as a spatiotemporal block or the like, which will be described later), and it is possible to determine that a sense of resolution is higher as the number of high-frequency components increases, and a sense of resolution is lower as the ratio of low-frequency components increases. More specifically, it is also possible to determine a sense of resolution quantitatively (for example, five levels from 1 to 5), depending on the ratio of high-frequency components having a frequency of a first threshold or more. That is, it is set that a sense of resolution is higher as the ratio of high-frequency components having a frequency of a threshold or more increases. Furthermore, it is also possible to perform frequency analysis to obtain a frequency distribution, and to determine a sense of resolution quantitatively, depending on the frequency distribution. Note that, also in this case, it is usually determined that a sense of resolution is higher as the number of high-frequency components increases, and a sense of resolution is lower as the ratio of low-frequency components increases.

Furthermore, a sense of resolution can be determined using, for example, an activity of pixel values in a space (referred to as a spatial activity). Specifically, for example, it is possible to determine that a sense of resolution is higher as the ratio of pixels that have a spatial activity of a first threshold or more increases. Furthermore, it is also possible to determine a sense of resolution quantitatively (for example, five levels from 1 to 5), depending on the ratio of pixels that have a spatial activity of the first threshold or more.

Moreover, any method for determining or obtaining a sense of resolution may be used.

Furthermore, the restrictive condition refers to, for example, a condition in which a pixel value of a pixel included in a field is set as a parameter. Furthermore, the restrictive condition refers to, for example, a condition in which a temporal activity of pixel values of pixels included in two or more fields that are temporally continuous is set as a parameter, the temporal activity being an amount of a change in the pixel values. Furthermore, the restrictive condition refers to, for example, a condition in which a spatial activity of pixel values of two or more pixels included in one field is set as a parameter, the spatial activity being a difference between the pixel values. More specifically, the restrictive condition refers to, for example, a condition for ensuring that a temporal activity of pixel values is in a predetermined range (a range is also possible that can be defined by a function of time t). More specifically, the restrictive condition refers to, for example, a condition for ensuring that a spatial activity of pixel values is in a predetermined range (a range is also possible that can be defined by a function of distance x from a reference point).

Furthermore, the restrictive condition refers to, for example, a condition in which a sense of resolution of an object in a field is set as a parameter. Furthermore, the restrictive condition refers to, for example, a condition in which a temporal activity of senses of resolution of objects in two or more fields that are temporally continuous is set as a parameter, the temporal activity being an amount of a change in the resolution. Furthermore, the restrictive condition refers to, for example, a condition in which a spatial activity of senses of resolution of two or more objects included in one field is set as a parameter, the spatial activity being a difference between the senses of resolution. More specifically, the restrictive condition refers to, for example, a condition for ensuring that a temporal activity of senses of resolution is in a predetermined range (a range is also possible that can be defined by a function of time t). More specifically, the restrictive condition refers to, for example, a condition for ensuring that a spatial activity of senses of resolution is in a predetermined range (a range is also possible that can be defined by a function of distance x from a reference point).

Note that an image may be a moving image or a still image. If an image is a moving image, the image includes two or more fields. Note that one field is one screen, and may also be referred to as one frame.

The restrictive condition storage unit 11 is preferably a non-volatile storage medium but may be realized by a volatile storage medium. Any process in which a restrictive condition is stored in the restrictive condition storage unit 11 may be used. For example, a restrictive condition may be stored in the restrictive condition storage unit 11 via a storage medium, a restrictive condition transmitted via a communication line or the like may be stored in the restrictive condition storage unit 11, or a restrictive condition input via an input device may be stored in the restrictive condition storage unit 11.

The accepting unit 12 accepts an image that is obtained by shooting a subject and has at least one field. The acceptance typically refers to acceptance of an image that is transmitted from broadcasting means. However, the acceptance is an idea encompassing acceptance of information input from an input device such as a mouse or a touch panel, acceptance of information transmitted via a wired or wireless communication line, acceptance of information read out from a storage medium such as an optical disk, a magnetic disk, or a semiconductor memory, and the like. The accepting unit 12 may be realized by, for example, broadcast reception means, or wired or wireless communication means.

The image changing unit 13 applies at least one restrictive condition to the at least one field of the image accepted by the accepting unit 12, changes the at least one field so that it satisfies the at least one restrictive condition, and acquires at least one new field. In this context, application of restrictive conditions may refer to application to one entire field, or to two or more entire fields.

Furthermore, application of restrictive conditions may refer to application of the restrictive conditions to two or more images (also referred to as spatiotemporal blocks) obtained by dividing one or multiple fields spatially, temporally, or spatiotemporally into two or more pieces. In this case, the image changing unit 13 divides the image accepted by the accepting unit 12 into two or more spatiotemporal blocks. Then, the image changing unit 13 applies at least one restrictive condition to the obtained multiple spatiotemporal blocks, and acquires multiple new spatiotemporal blocks that were changed so as to satisfy the at least one restrictive condition. Then, the image changing unit 13 combines the multiple new spatiotemporal blocks, and acquires an image to be output. Note that the spatiotemporal block is not limited to a rectangular successive region. The spatiotemporal block may also be a non-rectangular and non-successive image region. Furthermore, the spatiotemporal block may also be, for example, data obtained by dividing one screen (one field or one frame) into four pieces, or data obtained by dividing n screens (n is an integer of 2 or more) into eight pieces. Note that the number of divided pieces is arbitrary. Alternatively, a spatiotemporal block may also be one pixel.

Furthermore, if, for example, a restrictive condition is a condition in which the threshold is set for brightness, the image changing unit 13 performs, in the case where there is a pixel whose brightness exceeds the threshold, processing for reducing the brightness value of the pixel. Furthermore, in the case where there is a pixel whose brightness is less than the threshold, the image changing unit 13 performs processing for increasing the brightness value of the pixel.

Furthermore, if, for example, a restrictive condition is a condition in which the threshold is set for resolution, the image changing unit 13 performs filtering processing on the corresponding pixel and peripheral pixels around this pixel so that the resolutions thereof satisfies the restrictive condition.

The image changing unit 13 may typically be realized by an MPU, a memory, or the like. A processing procedure of the image changing unit 13 is typically realized by software, and the software is stored in a storage medium such as a ROM. However, the processing procedure may be realized also by hardware (a dedicated circuit).

The image output unit 14 outputs the at least one field acquired by the image changing unit 13. In this context, the output typically refers to display on a display screen, or projection using a projector. However, the output is an idea encompassing, for example, printing by a printer, transmission to an external apparatus (mainly a display apparatus), storing into a storage medium, and delivery of the processing results to another processing apparatus, another program, or the like.

The image output unit 14 may include or may not include an output device such as a display unit. The image output unit 14 may be realized by driver software for an output device, a combination of driver software for an output device and the output device, or the like.

Hereinafter, operation of the image processing apparatus 1 will be described with reference to the flowchart of FIG. 2.

(Step S201) It is judged whether or not an image has been accepted by the accepting unit 12. If it is determined that an image has been accepted, the procedure advances to step S202, and otherwise the procedure returns to step S201. In this context, the image includes one or at least two fields.

(Step S202) The image changing unit 13 reads out at least one restrictive condition stored in the restrictive condition storage unit 11.

(Step S203) The image changing unit 13 obtains one or more processing targets from the image accepted in step S201. The processing target refers to a target that is subjected to image processing. Note here that the image changing unit 13 usually divides the image accepted in step S201 spatially, temporally, or spatiotemporally so as to obtain two or more processing targets (which are the above-described spatiotemporal blocks). However, the image changing unit 13 may also use the image accepted in step S201 without dividing the image, directly as a processing target. Note here that a technique for dividing an image having at least one field is well known, and thus a detailed description thereof is omitted. Also, the two or more processing targets obtained by the division may overlap each other.

(Step S204) The image changing unit 13 substitutes 1 for a counter i.

(Step S205) The image changing unit 13 judges whether or not there is an ith processing target. If there is an ith processing target, the procedure advances to step S206, and otherwise the procedure advances to step S212.

(Step S206) The image changing unit 13 substitutes 1 for a counter j.

(Step S207) The image changing unit 13 judges whether or not there is a jth restrictive condition. If there is a jth restrictive condition, the procedure advances to step S208, and otherwise the procedure advances to step S211.

(Step S208) The image changing unit 13 judges whether or not the ith processing target satisfies the jth restrictive condition. If the ith processing target does not satisfy the jth restrictive condition, the procedure advances to step S209, and otherwise to step S210. Note that the processing target that was judged to satisfy the restrictive condition is directly written in and added to a buffer.

(Step S209) The image changing unit 13 corrects the ith processing target so that it satisfies the jth restrictive condition. Then, the image changing unit 13 writes and adds the corrected image in and to the buffer.

(Step S210) The image changing unit 13 increments the counter j by 1. The procedure returns to step S207.

(Step S211) The image changing unit 13 increments the counter i by 1. The procedure returns to step S205.

(Step S212) The image changing unit 13 configures an image from the processing target in the buffer.

(Step S213) The image output unit 14 outputs the new image that is configured and acquired in step S212. The procedure returns to step S201.

Figure 2:
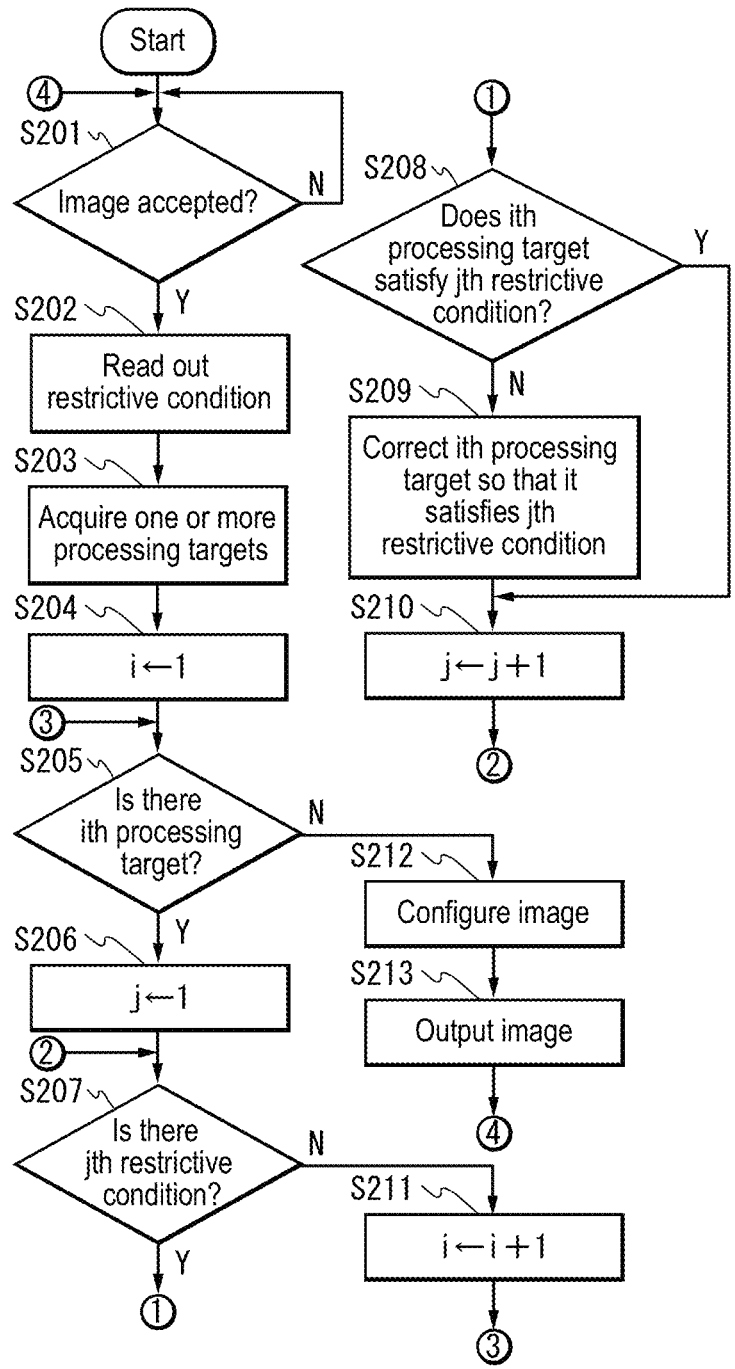
FIG. 2 is a flowchart illustrating the operation of the image processing apparatus of the embodiment.

Note that, in the flowchart of FIG. 2, the procedure is terminated by powering off or an interruption at completion of the processing.

As described above, according to the present embodiment, it is possible to output an image that is balanced over an entire screen or on the whole image. More specifically, according to the present embodiment, it is possible to output an image that satisfies a restrictive condition under which the image is in accordance with natural rules, allowing the viewer to feel a sense of perspective, a sense of depth, and the like that are needed to perceive the image as it really is.

Note that the processing in the present embodiment may be realized by software. This software may be distributed by software download or the like. Furthermore, this software, stored in a storage medium such as a CD-ROM, may be distributed. Note that the same is applied to other embodiments in this specification. Note that the software that realizes the image processing apparatus of the present embodiment is the following sort of program. That is, this program is a program using a storage medium in which at least one restrictive condition, which is to be applied to an image to be output and is acquired from a subject, is stored, the program causing a computer to function as: an accepting unit that accepts an image that is obtained by shooting the subject and has at least one field; an image changing unit that applies the at least one restrictive condition to the at least one field of the image accepted by the accepting unit, changes the at least one field so that the at least one field satisfies the at least one restrictive condition, and acquires at least one new field; and an image output unit that outputs the at least one field acquired by the image changing unit.

Embodiment 2

In this embodiment, an image processing apparatus 2 will be described that dynamically acquires, from an input image, a restrictive condition that is appropriate for an image to be output, applies the acquired restrictive condition to the input image, and acquires an image that is balanced on the whole and is to be output. That is, the present embodiment differs from Embodiment 1 in that a restrictive condition that is appropriate for an accepted input image is dynamically acquired from the input image.

Figure 3:
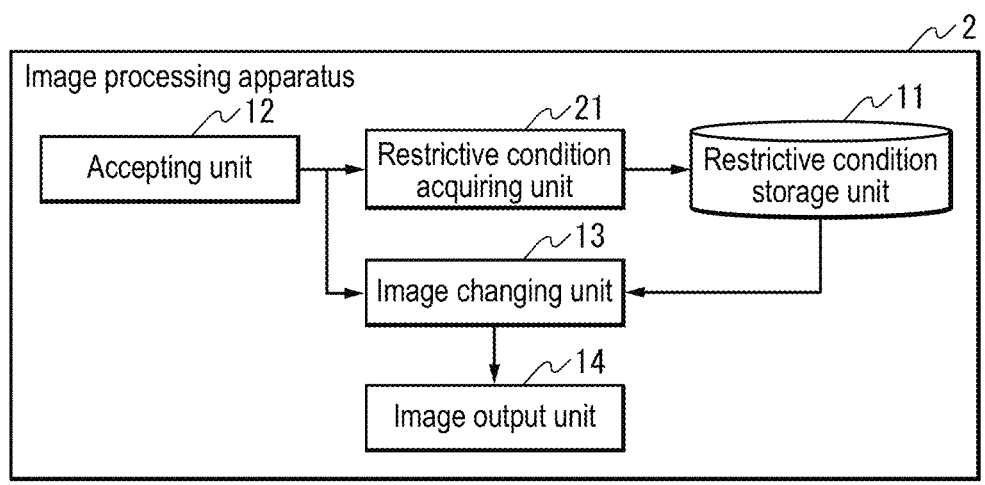
FIG. 3 is a block diagram illustrating an image processing apparatus according to Embodiment 2.

FIG. 3 is a block diagram of the image processing apparatus 2 according to the present embodiment.

The image processing apparatus 2 includes the restrictive condition storage unit 11, the accepting unit 12, a restrictive condition acquiring unit 21, the image changing unit 13, and the image output unit 14.

The restrictive condition acquiring unit 21 acquires at least one restrictive condition from at least one field of an image accepted by the accepting unit 12. In other words, the restrictive condition acquiring unit 21 acquires, from an image accepted by the accepting unit 12, at least one restrictive condition, which is to be applied to the image.

Specifically, for example, the restrictive condition acquiring unit 21 acquires, from at least one field of an image accepted by the accepting unit 12, at least one feature amount for each of one or more predetermined types. Then, the restrictive condition acquiring unit 21 acquires, for each type, a restrictive condition using the at least one feature amount that corresponds to the type.

More specifically, for example, the restrictive condition acquiring unit 21 acquires pixel values of all pixels of one field included in an image accepted by the accepting unit 12. Then, the restrictive condition acquiring unit 21 performs regression analysis using the least squares method or the like with respect to a spatial distribution of the pixel values of the pixels in the field, and obtains a regression surface. Then, the restrictive condition acquiring unit 21 acquires a restrictive condition for changing a pixel value that is different from the pixel value of the regression surface, that is, exceeding a predetermined threshold from the regression surface to the threshold so that the pixel value of each pixel is in a range of the predetermined threshold from the regression surface. Using such a restrictive condition, it is possible to define a region in which the pixel values of pixels should exist.

Furthermore, for example, the restrictive condition acquiring unit 21 creates a two or more dimensional graph, in which information on relative positions (such as distances or the orders) of pixels in a field from a reference pixel (for example, a pixel that has coordinate values (0, 0) and is located at the upper left part), and pixel values (L) thereof are plotted on axes, and performs regression analysis using the least squares method or the like with respect to the graph to obtain a regression curve or a regression surface. Note that the restrictive condition acquiring unit 21 may also create, for example, a three-dimensional graph of positions (x, y) and pixel values (L), or a four-dimensional graph of spatiotemporal positions (x, y, t) and pixel values (L), and may perform regression analysis using the least squares method or the like with respect to the graph to obtain a regression surface.

Figure 4:
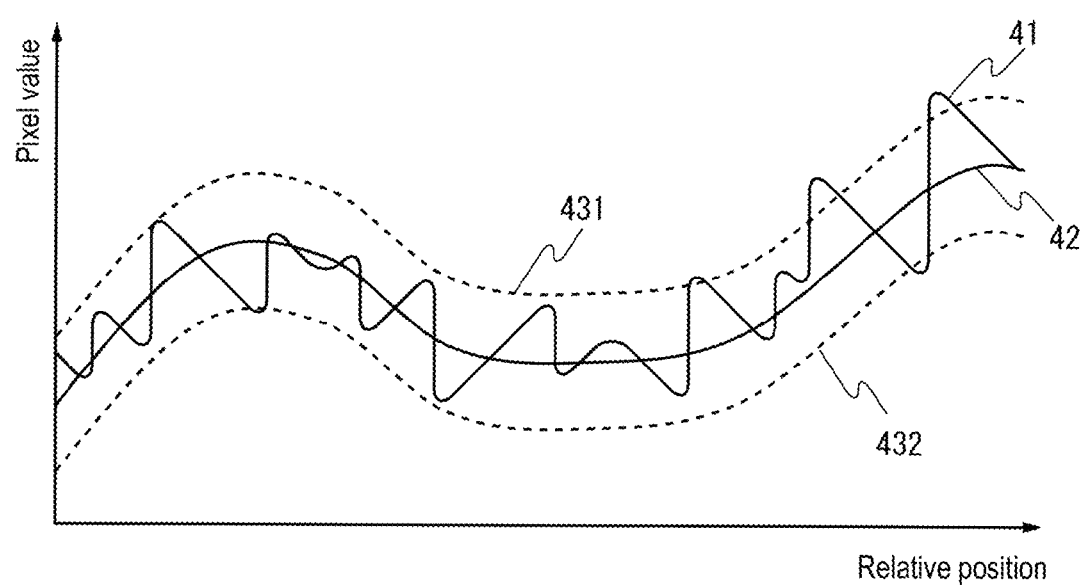
FIG. 4 is a diagram illustrating an image of restrictive conditions of the embodiment.

Then, the restrictive condition acquiring unit 21 acquires a restrictive condition for changing a pixel value that exceeds a predetermined threshold from the regression curve or the regression surface to the threshold so that the pixel value of each pixel is in a range of the predetermined threshold from the regression curve or the regression surface. An image diagram of such a restrictive condition is shown in FIG. 4. In FIG. 4, the reference numeral 41 denotes a two-dimensional graph acquired by the restrictive condition acquiring unit 21. The reference numeral 42 denotes a regression curve that is obtained by performing regression analysis on the graph 41. The reference numerals 431 and 432 show restrictive conditions. That is, the reference numeral 431 is a curve constituted by points that are distanced, by a predetermined threshold, from points on the regression curve in the plus direction, that is, a curve of maximum pixel values. The reference numeral 432 is a curve constituted by points that are distanced, by a predetermined threshold, from the points on the regression curve in the minus direction, that is, a curve of minimum pixel values.

Figure 5:
FIG. 5 is a diagram illustrating a specific example of a field of the embodiment.

Here, a specific example of a field is shown in FIG. 5. One field of an image is an image obtained by shooting a snow scene, as shown in FIG. 5. The restrictive condition acquiring unit 21 acquires, for example, brightness of pixels of the image of FIG. 5. Then, the restrictive condition acquiring unit 21 performs regression analysis using the least squares method or the like with respect to a spatial distribution in which coordinate values of the pixels and the brightness of the pixels are plotted on axes, and obtains a regression surface. Then, the restrictive condition acquiring unit 21 acquires a restrictive condition for changing the brightness that exceeds a predetermined threshold to the threshold so that the brightness of each pixel is in a range of the predetermined threshold from the regression surface. Such a restrictive condition is a restrictive condition having a tendency in which the brightness of pixels is higher in the foreground for the viewer and the brightness of pixels is lower the further they are in the background. An output image to which such a restrictive condition is applied is an image from which a viewer can feel a sense of spread of the snow scene and a sense of a heavy air of winter, that is, an image that is easily viewable for the viewer. In other words, such an output image is an image that has a good balance between a bright region, which is assumed to be in the foreground, and a dark region, which is assumed to be in the background.

Figure 6:
FIG. 6 is a diagram illustrating a specific example of the field of the embodiment.

More specifically, for example, the restrictive condition acquiring unit 21 acquires a sense of resolution of each of two or more objects (which may be spatiotemporal blocks) included in one field of an image accepted by the accepting unit 12. That is, the restrictive condition acquiring unit 21 recognizes two or more objects in one field, and acquires the coordinate values of the centroid of each object, and a sense of resolution thereof. Then, the restrictive condition acquiring unit 21 performs regression analysis using the least squares method or the like with respect to a spatial distribution in which the coordinate values of the centroids and the senses of resolution of the objects are plotted on axes, and obtains a regression surface. Then, the restrictive condition acquiring unit 21 acquires a restrictive condition for changing a sense of resolution that exceeds a predetermined threshold to the threshold so that the sense of resolution of each object is in a range of the predetermined threshold from the regression surface. With this restrictive condition, it is possible to define a region in which senses of resolution of the objects should exist. Here, a specific example of a field is shown in FIG. 6. One field of an image is an image obtained by shooting a sunflower field in which there are many sunflowers, as shown in FIG. 6. The restrictive condition acquiring unit 21 extracts flower parts (an example of objects) of sunflowers by performing contour extraction on the image of FIG. 6. Then, the restrictive condition acquiring unit 21 acquires the coordinate values of the centroid of the flower part of each sunflower, and a sense of resolution thereof. Then, the restrictive condition acquiring unit 21 performs regression analysis using the least squares method or the like with respect to a spatial distribution in which the coordinate values of the centroids and the senses of resolution of the flower parts of the sunflowers are plotted on axes, and obtains a regression surface. Then, the restrictive condition acquiring unit 21 acquires a restrictive condition for changing a sense of resolution that exceeds a predetermined threshold to a threshold so that the sense of resolution of the flower part of each sunflower is in a range of the predetermined threshold from the regression surface. Such a restrictive condition is a restrictive condition having a tendency in which the senses of resolution of the flower parts of the sunflowers are higher in the foreground for the viewer and the senses of resolution of the flower parts of the sunflowers are lower the further they are in the background. An output image to which such a restrictive condition is applied is an image from which a viewer can feel a sense of perspective and a sense of depth, that is, an image that is easily viewable for the viewer.

Note that the restrictive condition acquiring unit 21 acquires a sense of resolution in the below described manner, for example. That is, the restrictive condition acquiring unit 21 divides one field into two or more spatiotemporal blocks. The restrictive condition acquiring unit 21 performs frequency analysis with respect to each spatiotemporal block. Then, the restrictive condition acquiring unit 21 calculates the ratio of high-frequency components having a frequency of a first threshold or more. Then, the restrictive condition acquiring unit 21 determines a sense of resolution based on the ratio of high-frequency components. Note that it is assumed that the restrictive condition acquiring unit 21 holds, for example, a correspondence table of ranges of the ratios of high-frequency components, and senses of resolution. The restrictive condition acquiring unit 21 may also hold a correspondence table of frequency distributions and senses of resolution. In this case, the restrictive condition acquiring unit 21 may perform frequency analysis with respect to each spatiotemporal block to obtain a frequency distribution, and may acquire a sense of resolution that constitutes a pair with a frequency distribution that is most approximate to the obtained frequency distribution.

Furthermore, the restrictive condition acquiring unit 21 may also obtain a sense of resolution in the below described manner, for example. That is, the restrictive condition acquiring unit 21 acquires a spatial activity of pixels constituting an image or a part thereof (spatiotemporal block). Then, the restrictive condition acquiring unit 21 acquires the ratio of pixels that have a spatial activity of a threshold or more. Then, the restrictive condition acquiring unit 21 determines a sense of resolution based on the ratio. Note that it is assumed that the restrictive condition acquiring unit 21 holds, for example, a correspondence table of ranges of ratios of pixels that have a spatial activity of the threshold or more, and senses of resolution. The restrictive condition acquiring unit 21 may also hold a correspondence table of distributions of the spatial activities and senses of resolution. In this case, the restrictive condition acquiring unit 21 may obtain the spatial activities of pixels constituting an image or a part thereof, and may acquire a sense of resolution that constitutes a pair with a spatial activity distribution that is most approximate to the distribution of the obtained spatial activities.

The restrictive condition acquiring unit 21 may typically be realized by an MPU, a memory, or the like. A processing procedure of the restrictive condition acquiring unit 21 is typically realized by software, and the software is stored in a storage medium such as a ROM. However, the processing procedure may be realized also by hardware (a dedicated circuit).

Figure 7:
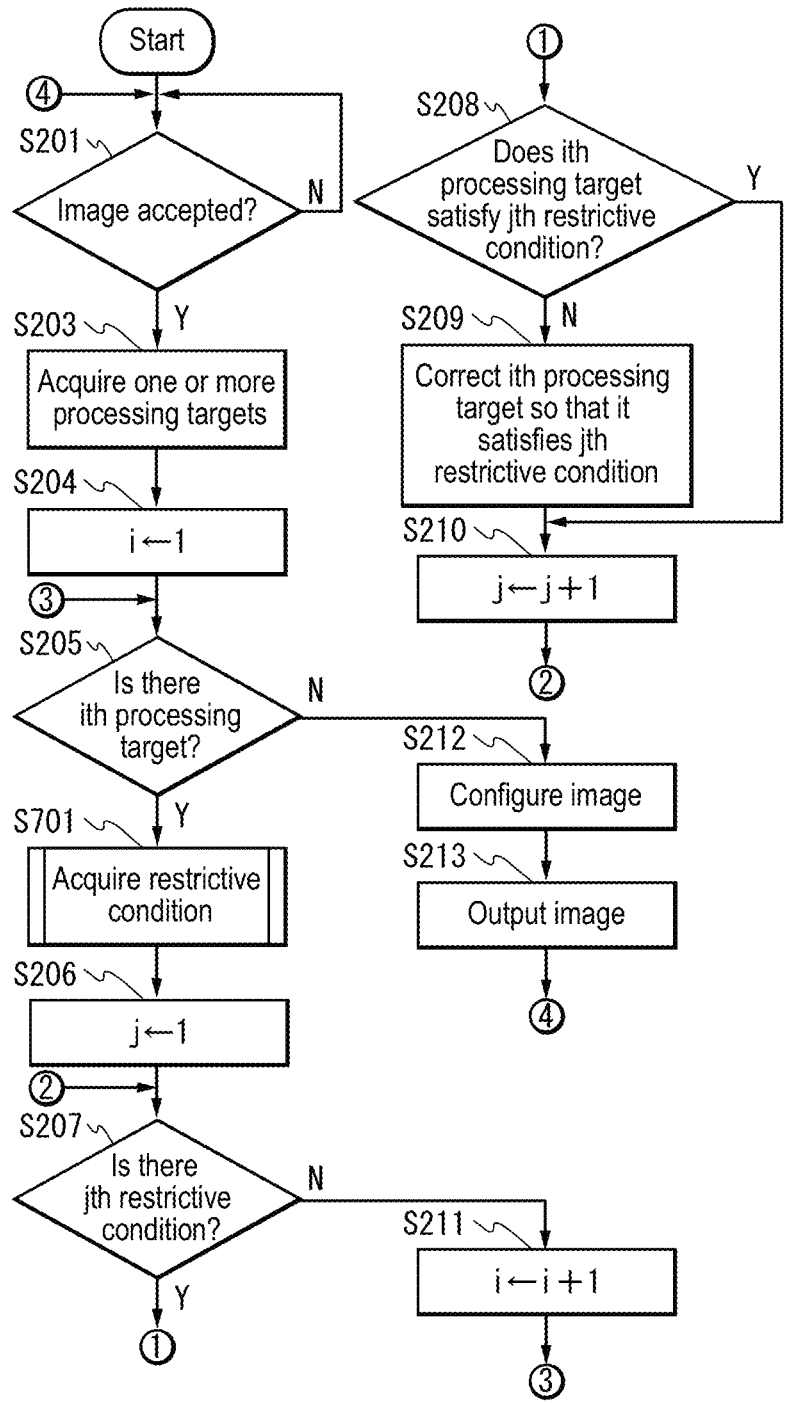
FIG. 7 is a flowchart illustrating the operation of the image processing apparatus of the embodiment.

Hereinafter, operation of the image processing apparatus 2 will be described with reference to the flowchart of FIG. 7. In the flowchart of FIG. 7, descriptions of the same steps as those in the flowchart of FIG. 2 are omitted.

(Step S701) The restrictive condition acquiring unit 21 acquires at least one restrictive condition for the ith processing target. This processing refers to restrictive condition acquiring processing. The restrictive condition acquiring processing will be described with reference to the flowchart of FIG. 8.

Note that, in the flowchart of FIG. 7, the restrictive condition is acquired for each processing target. However, the restrictive condition may be acquired, for example, for each image accepted by the accepting unit 12. That is, a processing target and a restrictive condition are not necessarily in one-to-one correspondence.

Furthermore, in the flowchart of FIG. 7, the procedure is terminated by powering off or an interruption at completion of the processing.

Hereinafter, the restrictive condition acquiring processing in step S701 will be described with reference to the flowchart of FIG. 8.

(Step S801) The restrictive condition acquiring unit 21 substitutes 1 for a counter i.

(Step S802) The restrictive condition acquiring unit 21 judges whether or not there is an ith type of feature amount to be acquired. If there is an ith type of feature amount to be acquired, the procedure advances to step S803, and otherwise, the procedure returns to the previous process. Note that the type of feature amount to be acquired is typically predetermined. Examples of the type of feature amount to be acquired include a pixel value and a sense of resolution.

(Step S803) The restrictive condition acquiring unit 21 acquires the ith type of at least one feature amount of a processing target.

(Step S804) The restrictive condition acquiring unit 21 performs analysis processing on the at least one feature amount acquired in step S803. Note that the analysis processing is, for example, the above-described regression analysis.

(Step S805) The restrictive condition acquiring unit 21 applies a condition that is predetermined for the ith type of feature amount to be acquired to the analysis result of step S804, and acquires a restrictive condition.

(Step S806) The restrictive condition acquiring unit 21 increments the counter i by 1.

Figure 8:
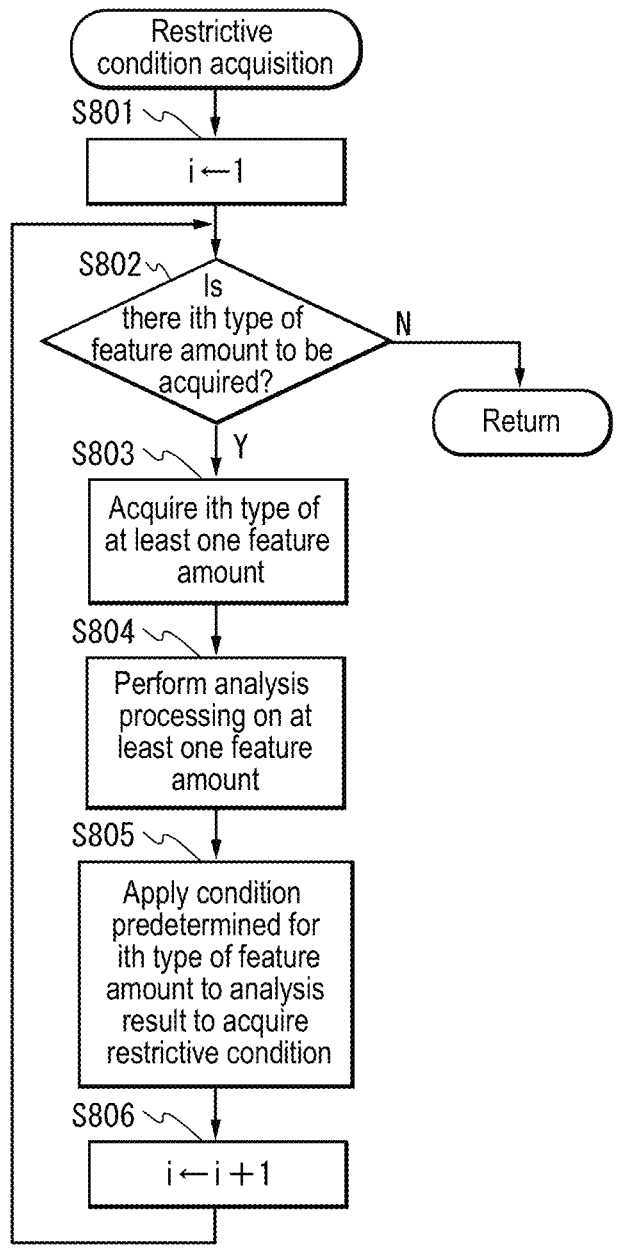
FIG. 8 is a flowchart illustrating restrictive condition acquiring processing of the embodiment.

Note that, in the flowchart of FIG. 8, the analysis processing in step S804 is not necessarily needed. In this case, in step S805, the restrictive condition acquiring unit 21 applies a condition that is predetermined for the ith type of feature amount to be acquired to the at least one feature amount acquired in step S803, and acquires a restrictive condition.

As described above, according to the present embodiment, it is possible to output an image that is balanced on the whole. Furthermore, according to the present embodiment, it is possible to dynamically acquire, from an input image, a restrictive condition that is appropriate for an image to be output, to apply the acquired restrictive condition to the input image, and to output an image that is balanced on the whole.

Note that the software that realizes the image processing apparatus of the present embodiment is the following sort of program. That is, this program is a program using a storage medium, the program causing a computer to function as: an accepting unit that accepts an image that is obtained by shooting a subject and has at least one field; a restrictive condition acquiring unit that acquires at least one restrictive condition from the at least one field of the image accepted by the accepting unit; an image changing unit that applies the at least one restrictive condition to the at least one field of the image accepted by the accepting unit, changes the at least one field so that the at least one field satisfies the at least one restrictive condition, and acquires at least one new field; and an image output unit that outputs the at least one field acquired by the image changing unit.

Embodiment 3

In this embodiment, an image processing apparatus 3 will be described that dynamically selects a restrictive condition that is appropriate for an image to be output, applies the selected restrictive condition to the image, and outputs an image that is balanced on the whole. That is, the present embodiment differs from Embodiment 1 in that a restrictive condition that is appropriate for an accepted input image is dynamically selected.

Figure 9:
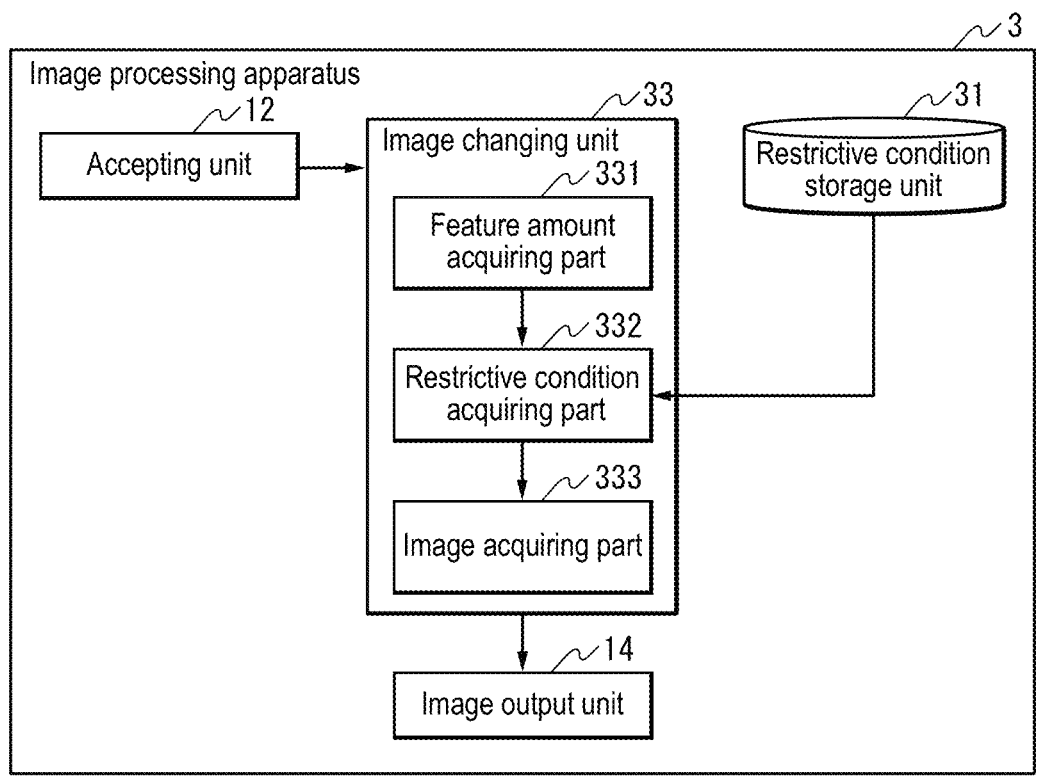
FIG. 9 is a block diagram illustrating an image processing apparatus according to Embodiment 3.

FIG. 9 is a block diagram illustrating the image processing apparatus 3 according to the present embodiment.

The image processing apparatus 3 includes a restrictive condition storage unit 31, the accepting unit 12, an image changing unit 33, and the image output unit 14.

The image changing unit 33 includes a feature amount acquiring part 331, a restrictive condition acquiring part 332, and an image acquiring part 333.

The restrictive condition storage unit 31 is a storage unit in which at least two pairs of at least one restrictive condition and a feature amount condition can be stored. The feature amount condition refers to a condition relating to a feature amount of an object in a field.

In this context, the feature amount of an object in a field may be referred to as a feature amount of the field. The object in a field may be a substantive object (e.g., a sunflower in an image), a spatiotemporal block that is obtained by dividing an image, or the like. Also, examples of the feature amount include a vicinity feature amount, which is a feature amount of a part of at least one field, and a whole feature amount, which is a feature amount of the whole of at least one field. Examples of the vicinity feature amount include a pixel value, an activity, a spatiotemporal correlation, a motion vector, a frequency distribution, and the like. Also, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature amount include a pixel value distribution in the whole of an image, a motion vector distribution in the whole of an image, a spatiotemporal correlation of the whole of one or at least two images, an amount of noise of the whole of an image, an image format, the number of objects in a field (for example, singular or plural), content information relating to a content, which is one or more images, and a pattern detection result (face, etc.). In this context, the content information refers to, for example, the genres, the titles, and the names of people appearing in programs listed in an electronic program guide (EPG). Note that the at least one feature amount is also referred to as a feature amount vector as appropriate.

Examples of the feature amount condition include the number of objects (for example, singular or plural), a dynamic range of multiple pixels in a field, and a dynamic range of multiple pixels in a spatiotemporal block. Furthermore, the feature amount condition may be, for example, a range of senses of resolution or a distribution of senses of resolution in a spatiotemporal block, a regression surface obtained by performing regression analysis on a distribution of senses of resolution, or the like. Furthermore, the feature amount condition may be, for example, a range of pixel values or a distribution of pixel values in a spatiotemporal block, a regression surface obtained by performing a regression analysis on a distribution of pixel values, or the like.

The restrictive condition storage unit 31 is preferably a non-volatile storage medium but may be realized by a volatile storage medium. Any process in which information (a pair of a restrictive condition and a feature amount condition) is stored in the restrictive condition storage unit 31 may be used. For example, information may be stored in the restrictive condition storage unit 31 via the storage medium, information transmitted via a communication line or the like may be stored in the restrictive condition storage unit 31, or information input via an input device may be stored in the restrictive condition storage unit 31.

The image changing unit 33 applies at least one restrictive condition to at least one field of an image accepted by the accepting unit 12, changes the at least one field so that it satisfies the at least one restrictive condition, and acquires at least one new field.

The image changing unit 33 may typically be realized by an MPU, a memory, or the like. A processing procedure of the image changing unit 33 is typically realized by software, and the software is stored in a storage medium such as a ROM. However, the processing procedure may be realized also by hardware (a dedicated circuit).

The feature amount acquiring part 331 that constitutes the image changing unit 33 acquires, from the at least one field of the image accepted by the accepting unit 12, at least one predetermined feature amount. The feature amount acquiring part 331 may divide the at least one field into one or more spatiotemporal blocks (serving also as processing targets), and may acquire, from each processing target, at least one predetermined feature amount. The acquiring of at least one feature amount from a spatiotemporal block even means acquiring of at least one feature amount from at least one field. Note that examples of the feature amount acquired by the feature amount acquiring part 331 include the number of objects, a sense of resolution, a distribution of senses of resolution, a regression surface obtained by performing regression analysis on a distribution of senses of resolution, a pixel value, a distribution of pixel values, and a regression surface obtained by performing regression analysis on a distribution of pixel values.

The feature amount acquiring part 331 may typically be realized by an MPU, a memory, or the like. A processing procedure of the feature amount acquiring part 331 is typically realized by software, and the software is stored in a storage medium such as a ROM. However, the processing procedure may also be realized by hardware (a dedicated circuit).

The restrictive condition acquiring part 332 determines at least one feature amount condition that matches the at least one feature amount, and acquires, from the restrictive condition storage unit 31, at least one restrictive condition that constitutes a pair with each of the at least one feature amount condition. For example, if the feature amount is a regression surface obtained by performing regression analysis on a distribution of senses of resolution, the restrictive condition acquiring part 332 determines a regression surface (feature amount condition) that is most approximate to the obtained regression surface, and acquires, from the restrictive condition storage unit 31, at least one restrictive condition that constitutes a pair with this most approximate regression surface. Furthermore, if the feature amount is a sense of resolution, the restrictive condition acquiring part 332 determines a feature amount condition that corresponds to the sense of resolution, and acquires, from the restrictive condition storage unit 31, at least one restrictive condition that constitutes a pair with the determined feature amount condition. Furthermore, if the feature amount is a regression surface obtained by performing regression analysis on a distribution of pixel values, the restrictive condition acquiring part 332 determines a regression surface (feature amount condition) that is most approximate to the obtained regression surface, and acquires, from the restrictive condition storage unit 31, at least one restrictive condition that constitutes a pair with this most approximate regression surface.

The restrictive condition acquiring part 332 may typically be realized by an MPU, a memory, or the like. A processing procedure of the restrictive condition acquiring part 332 is typically realized by software, and the software is stored in a storage medium such as a ROM. However, the processing procedure may also be realized by hardware (a dedicated circuit).

The image acquiring part 333 applies the at least one restrictive condition acquired by the restrictive condition acquiring part 332 to the at least one field of the image accepted by the accepting unit 12, changes the at least one field so that it satisfies the at least one restrictive condition, and acquires at least one new field. The processing of the image acquiring part 333 is the same as the processing of the image changing unit 13.

The image acquiring part 333 may typically be realized by an MPU, a memory, or the like. A processing procedure of the image acquiring part 333 is typically realized by software, and the software is stored in a storage medium such as a ROM. However, the processing procedure may also be realized by hardware (a dedicated circuit).

Figure 10:
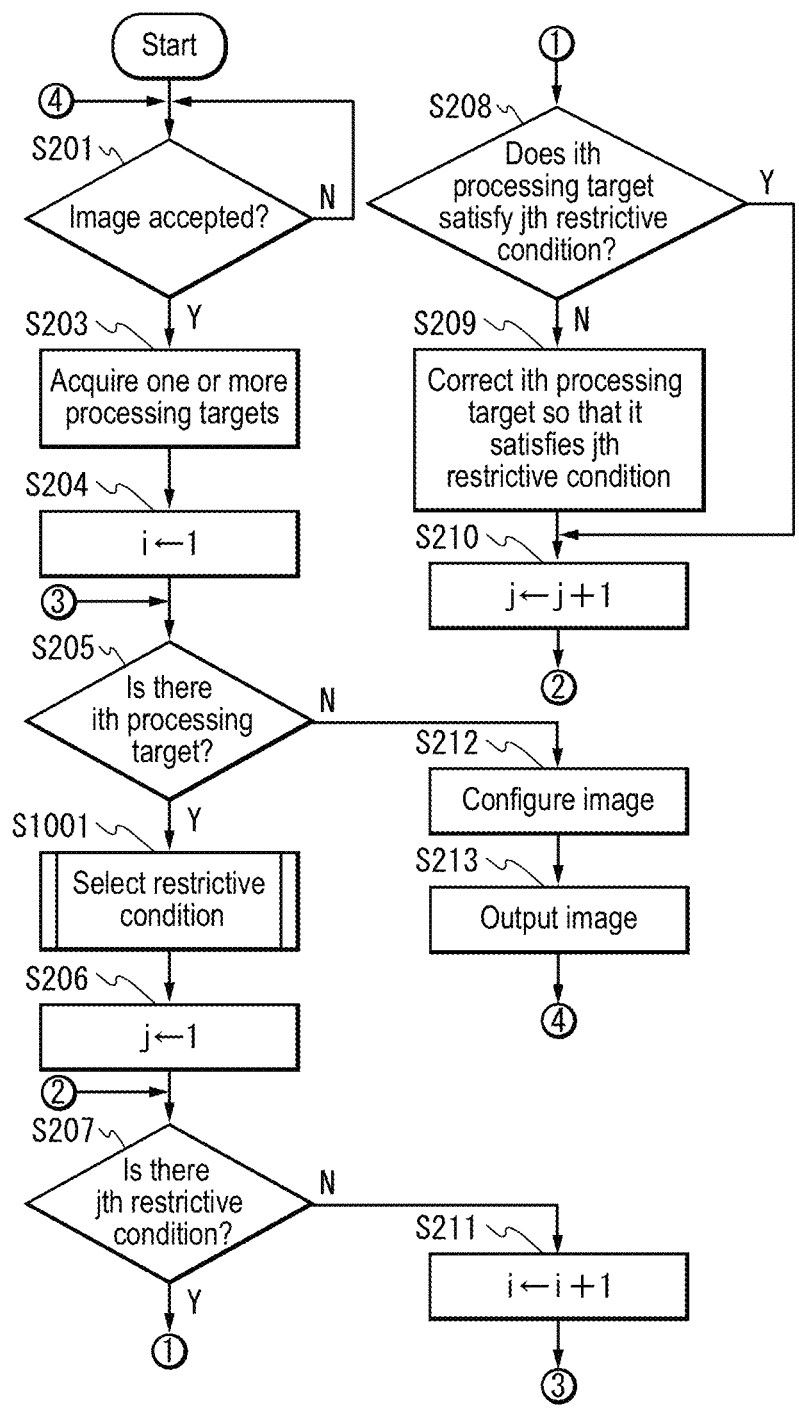
FIG. 10 is a flowchart illustrating the operation of the image processing apparatus of the embodiment.

Hereinafter, operation of the image processing apparatus 3 will be described with reference to the flowchart of FIG. 10. In the flowchart of FIG. 10, descriptions of the same steps as those in the flowchart of FIG. 2 are omitted.

(Step S1001) The image changing unit 33 selects at least one restrictive condition for the ith processing target. This processing is referred to as restrictive condition selecting processing. The restrictive condition selecting processing will be described with reference to the flowchart of FIG. 11.

Note that, in the flowchart of FIG. 10, the restrictive condition is selected for each processing target. However, the restrictive condition may be acquired for each image accepted by the accepting unit 12, for example. That is, a processing target and a restrictive condition are not necessarily in one-to-one correspondence.

Furthermore, in the flowchart of FIG. 10, the procedure is terminated by powering off or an interruption at completion of the processing.

Figure 11:
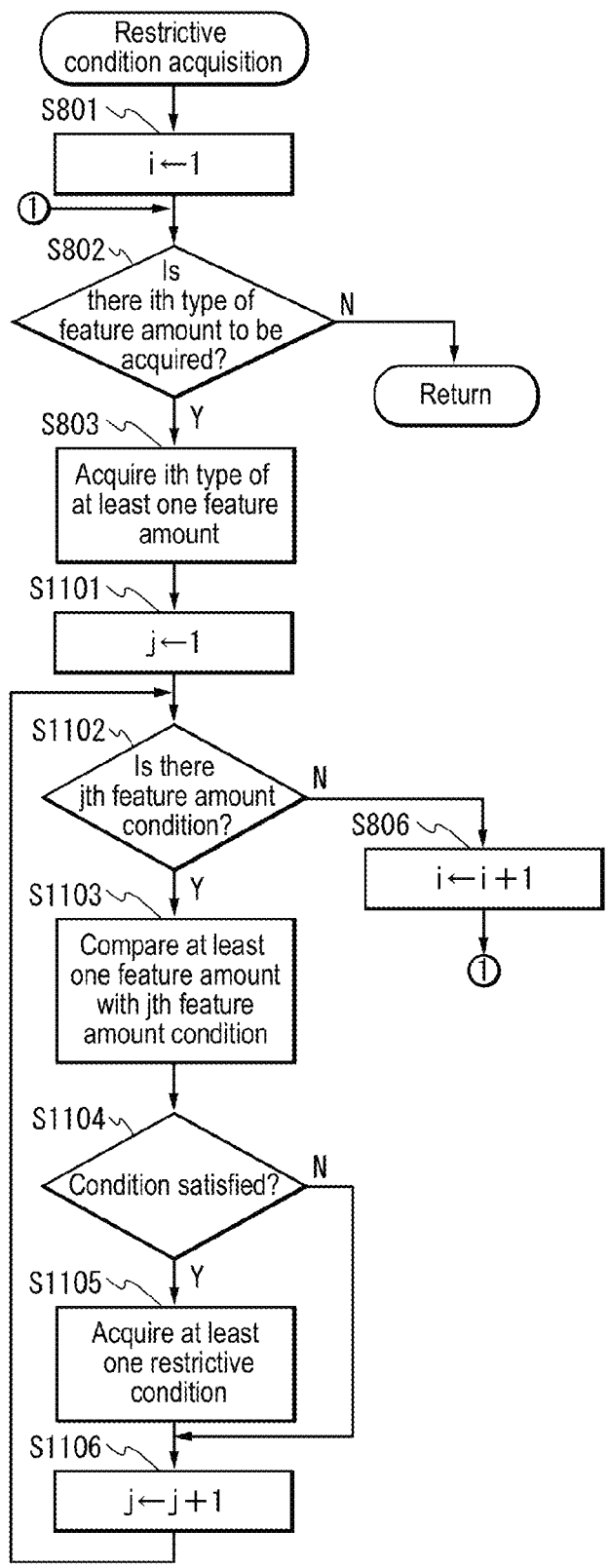
FIG. 11 is a flowchart illustrating restrictive condition selecting processing of the embodiment.

Hereinafter, the restrictive condition selecting processing of step S1001 will be described with reference to the flowchart of FIG. 11. In the flowchart of FIG. 11, descriptions of the same steps as those in the flowchart of FIG. 8 are omitted.

(Step S1101) The restrictive condition acquiring part 332 substitutes 1 for a counter j.

(Step S1102) The restrictive condition acquiring part 332 judges whether or not there is a jth feature amount condition in the restrictive condition storage unit 31. If there is a jth feature amount condition, the procedure advances to step S1103, and otherwise to step S806.

(Step S1103) The restrictive condition acquiring part 332 compares the at least one feature amount acquired by the feature amount acquiring part 331 in step S803 with the jth feature amount condition stored in the restrictive condition storage unit 31.

(Step S1104) The restrictive condition acquiring part 332 judges, as a result of the comparison in step S1103, whether or not the at least one feature amount satisfies the jth feature amount condition. If the at least one feature amount satisfies the jth feature amount condition, the procedure advances to step S1105, and otherwise to step S1106.

(Step S1105) The restrictive condition acquiring part 332 acquires, from the restrictive condition storage unit 31, at least one restrictive condition that constitutes a pair with the jth feature amount condition.

(Step S1106) The restrictive condition acquiring part 332 increments the counter j by 1. The procedure returns to step S1102.

As described above, according to the present embodiment, it is possible to output an image that is balanced on the whole. Furthermore, according to the present embodiment, it is possible to dynamically select restrictive conditions that are appropriate for an image to be output, to apply the selected restrictive conditions to the image, and to output an image that is balanced on the whole.

Note that the software that realizes the image processing apparatus according to the present embodiment is the following sort of program. That is, this program is a program using a storage medium in which at least two pairs of at least one restrictive condition and a feature amount condition, which relates to a feature amount of an object in a field, are stored, the program causing a computer to function as: an accepting unit that accepts an image that is obtained by shooting a subject and has at least one field; an image changing unit that applies the at least one restrictive condition to the at least one field of the image accepted by the accepting unit, changes the at least one field so that the at least one field satisfies the at least one restrictive condition, and acquires at least one new fields; and an image output unit that outputs the at least one new fields acquired by the image changing unit, wherein the image changing unit includes: a feature amount acquiring part that acquires at least one predetermined feature amount from the at least one field of the image accepted by the accepting unit; a restrictive condition acquiring part that determines at least one feature amount condition that matches the at least one feature amount, and acquires, from the restrictive condition storage unit, at least one restrictive condition that constitutes a pair with each of the at least one feature amount condition; and an image acquiring part that applies the at least one restrictive condition acquired by the restrictive condition acquiring part to the at least one field of the image accepted by the accepting unit, changes the at least one field so that the at least one field satisfies the at least one restrictive condition, and acquires at least one new field.

Embodiment 4

In this embodiment, an image processing apparatus 4 will be described that applies at least one restrictive condition that can be acquired from a subject to each of one or more images obtained by shooting the subject, processes the input images so that they satisfy the restrictive conditions, and obtains an image to be output. The present embodiment differs from Embodiment 1 in that predetermined image processing is performed on an accepted input image, the image on which the image processing is performed (referred to as a processed image) is changed so as to satisfy the restrictive conditions, and an image to be output is acquired.

Figure 12:
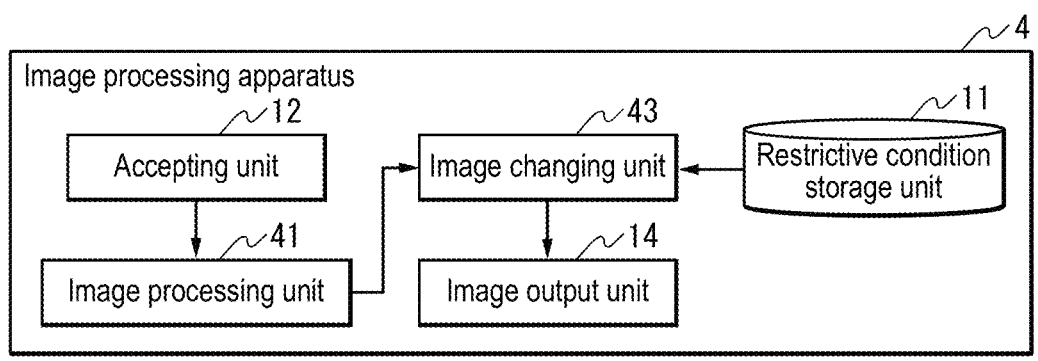
FIG. 12 is a block diagram illustrating an image processing apparatus 4 according to Embodiment 4.

FIG. 12 is a block diagram illustrating the image processing apparatus 4 according to the present embodiment. The image processing apparatus 4 is, for example, a television receiver, a DVD player, or the like.

The image processing apparatus 4 includes the restrictive condition storage unit 11, the accepting unit 12, an image processing unit 41, an image changing unit 43, and the image output unit 14.

The image processing unit 41 processes an image accepted by the accepting unit 12 to obtain a processed image. Here, examples of the image processing performed by the image processing unit 41 include pixel number conversion processing and noise removal processing. However, the image processing may be other processing. Note that the pixel number conversion processing and the noise removal processing are well-known techniques, and thus descriptions thereof are omitted.

The image changing unit 43 applies at least one restrictive condition to at least one field of the processed image, changes the at least one field so that it satisfies the at least one restrictive condition, and acquires at least one new field. The processing of the image changing unit 43 differs from the processing of the image changing unit 13 in that the processed image obtained by the image processing unit 41 is usually defined as a processing target.

Furthermore, in the case where the restrictive condition is a condition in which the threshold is set for brightness, the image changing unit 43 changes, if there is a pixel whose brightness does not satisfy the threshold, the processing of the image processing unit 41 to processing for making the brightness value of the pixel satisfy the restrictive condition. The changing of the processing of the image processing unit 41 refers to, for example, changing of a processing parameter used by the image processing unit 41.

Furthermore, in the case where, for example, the restrictive condition is a condition in which the threshold is set for resolution, the image changing unit 43 changes the processing of the image processing unit 41 to processing for making the resolution satisfy the restrictive condition. The changing of the processing of the image processing unit 41 refers to, for example, changing of a processing parameter used by the image processing unit 41.

The image processing unit 41 and the image changing unit 43 may typically be realized by MPUs, memories, or the like. Processing procedures of the image processing unit 41 and the like are realized typically by software, and the software is stored in a storage medium such as a ROM. However, the processing procedures may be realized also by hardware (dedicated circuits).

Figure 13:
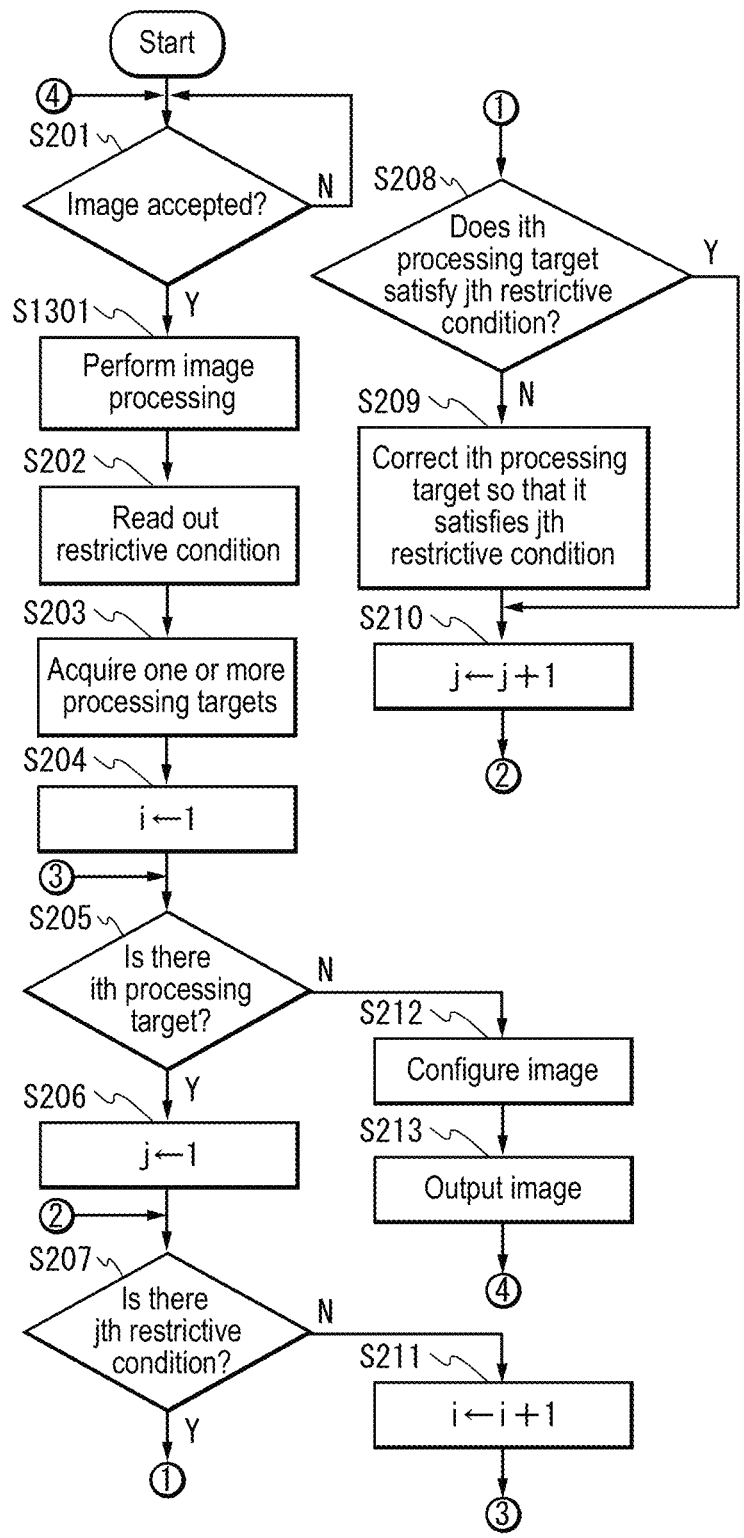
FIG. 13 is a flowchart illustrating the operation of the image processing apparatus 4 of the embodiment.

Hereinafter, operation of the image processing apparatus 4 will be described with reference to the flowchart of FIG. 13. In the flowchart of FIG. 13, only steps that are different from those in the flowchart of FIG. 2 will be described.

(Step S1301) The image processing unit 41 processes an image accepted by the accepting unit 12 to obtain a processed image.

Note that, in step S203 of the flowchart of FIG. 13, the image changing unit 43 acquires one or more processing targets from the processed image.

Furthermore, in the flowchart of FIG. 13, the procedure is terminated by powering off or an interruption at completion of the processing.

As described above, according to the present embodiment, even if an entire screen is out of balance due to image processing (that may be referred to as preprocessing) such as pixel number conversion processing or noise removal processing, it is possible to output an image that is balanced over an entire screen or on the whole image. More specifically, according to the present embodiment, even if an entire screen is out of balance due to image processing such as pixel number conversion processing or noise removal processing, it is possible to output an image that satisfies a restrictive condition under which the image is in accordance with natural rules, allowing a viewer to feel a sense of perspective, a sense of depth, and the like that are needed to perceive the image as it really is.

Note that an aspect of the present embodiment in which the processing of the image processing unit 41 is performed before the processing of the image changing unit may of course be applied to other image processing apparatus, such as the image processing apparatus 2 of Embodiment 2 or the image processing apparatus 3 of Embodiment 3. If the image processing apparatus 2 includes the image processing unit 41, the restrictive condition acquiring unit 21 typically acquires at least one restrictive condition from at least one field of an image accepted by the accepting unit 12. However, also in this case, the restrictive condition acquiring unit 21 may acquire at least one restrictive condition from at least one field of a processed image, which is the resultant of the processing of the image processing unit 41. Furthermore, if the image processing apparatus 3 includes the image processing unit 41, the feature amount acquiring part 331 typically acquires at least one predetermined feature amount from at least one field of an image accepted by the accepting unit 12. However, also in this case, the feature amount acquiring part 331 may acquire at least one predetermined feature amount from at least one field of a processed image, which is the resultant of the processing of the image processing unit 41.

Furthermore, the software that realizes the image processing apparatus according to the present embodiment is the following sort of program. That is, this program is a program using a storage medium in which at least one restrictive condition, which is to be applied to an image to be output and is acquired from a subject, is stored, the program causing a computer to function as: an accepting unit that accepts an image that is obtained by shooting the subject and has at least one field; an image processing unit that processes the image accepted by the accepting unit to obtain a processed image; an image changing unit that applies the at least one restrictive condition to the at least one field of the processed image, changes the at least one field so that the at least one field satisfies the at least one restrictive condition, and acquires at least one new field; and an image output unit that outputs the at least one field acquired by the image changing unit.

Embodiment 5

In this embodiment, an image processing apparatus 5 will be described that dynamically acquires, from an input image, a restrictive condition that is appropriate for an image to be output, applies the acquired restrictive condition to the input image, and acquires an image that is balanced on the whole and is to be output. The present embodiment differs from Embodiment 2 and Embodiment 3 in that the restrictive condition is acquired using information other than the input image.

Figure 14:
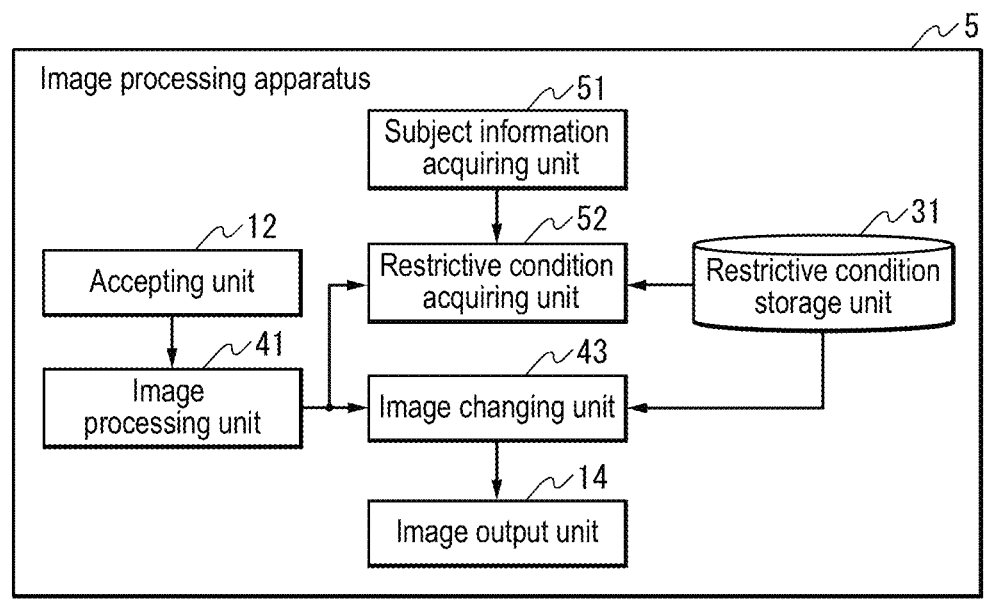
FIG. 14 is a block diagram illustrating an image processing apparatus 5 according to Embodiment 5.

FIG. 14 is a block diagram illustrating the image processing apparatus 5 according to the present embodiment. The image processing apparatus 5 is, for example, a television receiver, a DVD player, or the like.

The image processing apparatus 5 includes the restrictive condition storage unit 31 (or the restrictive condition storage unit 11), the accepting unit 12, the image processing unit 41, a subject information acquiring unit 51, a restrictive condition acquiring unit 52, the image changing unit 43, and the image output unit 14.

The subject information acquiring unit 51 acquires one or more pieces of information relating to a subject (referred to as subject information). The subject refers to an object shown up in an image accepted by the accepting unit 12. The subject information typically refers to an attribute of the subject. For example, the subject information is a distance to the subject from a camera. The subject information may be, for example, the actual size of the subject, the luminance of the subject, or the like. The subject information acquiring unit 51 acquires, for example, a distance between the subject and the camera using a distance measuring sensor. The subject information acquiring unit 51 acquires, for example, the luminance of the subject using a luminance sensor. Furthermore, the subject information acquiring unit 51 may also accept, from a user, subject information, such as a distance between the subject and the camera, or the actual size of the subject.

The subject information acquiring unit 51 may be realized by, for example, a distance measuring sensor, a luminance sensor, or means for accepting an input from input means.

The restrictive condition acquiring unit 52 acquires at least one restrictive condition using the one or more pieces of subject information acquired by the subject information acquiring unit 51. Furthermore, the restrictive condition acquiring unit 52 may also acquire at least one restrictive condition, using the image and the one or more pieces of subject information acquired by the subject information acquiring unit 51. Furthermore, the restrictive condition acquiring unit 52 may also acquire directly one or more pieces of subject information acquired by the subject information acquiring unit 51, as a restrictive condition. Note that, in this context, the image refers to a processed image obtained by the image processing unit 41, but may be an image accepted by the accepting unit 12. Furthermore, the image refers to whole or part of the image.

Specifically, for example, the restrictive condition storage unit 31 holds at least two pairs of a range of a distance from a camera, and at least one restrictive condition in which a feature amount, such as the brightness or a sense of resolution, is set as a parameter. The restrictive condition acquiring unit 52 acquires at least one restrictive condition that corresponds to the distance from the camera that was acquired by the subject information acquiring unit 51.

More specifically, for example, the restrictive condition acquiring unit 52 acquires at least one restrictive condition that corresponds to the at least one feature amount acquired from the image, and to the one or more pieces of subject information acquired by the subject information acquiring unit 51. That is, the restrictive condition acquiring unit 52 determines at least one feature amount condition that matches the at least one feature amount acquired from the image and the one or more pieces of subject information acquired by the subject information acquiring unit 51. Then, the restrictive condition acquiring unit 52 acquires at least one restrictive condition that constitutes a pair with each of the at least one determined feature amount condition.

More specifically, for example, the restrictive condition acquiring unit 52 acquires, as a restrictive condition, the subject luminance acquired by the subject information acquiring unit 51.

The restrictive condition acquiring unit 52 may typically be realized by an MPU, a memory, or the like. A processing procedure of the restrictive condition acquiring unit 52 is typically realized by software, and the software is stored in a storage medium such as a ROM. However, the processing procedure may be realized also by hardware (a dedicated circuit).

Figure 15:
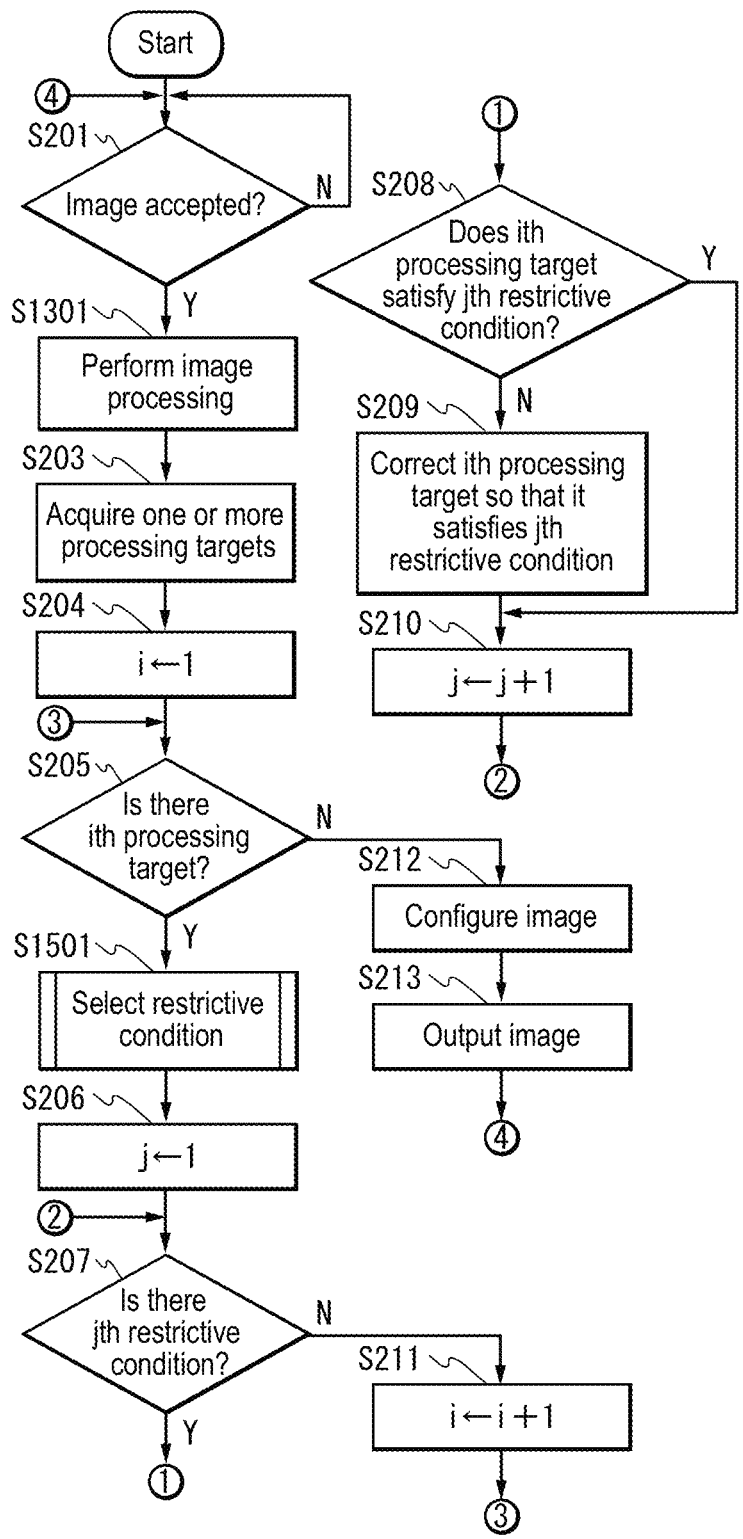
FIG. 15 is a flowchart illustrating the operation of the image processing apparatus 5 of the embodiment.

Hereinafter, operation of the image processing apparatus 5 will be described with reference to the flowchart of FIG. 15. In the flowchart of FIG. 15, only steps that are different from those of the flowchart of FIG. 13 will be described.

(Step S1501) The restrictive condition acquiring unit 52 acquires at least one restrictive condition for the ith processing target. This processing is referred to as restrictive condition selecting processing. The restrictive condition selecting processing will be described with reference to the flowchart of FIG. 16.

Note that, in the flowchart of FIG. 15, a restrictive condition is acquired for each processing target. However, the restrictive condition may be acquired, for example, for each processed image obtained by the image processing unit 41. That is, a processing target and a restrictive condition are not necessarily in one-to-one correspondence.

Furthermore, in the flowchart of FIG. 15, the procedure is terminated by powering off or an interruption at completion of the processing.

Figure 16:
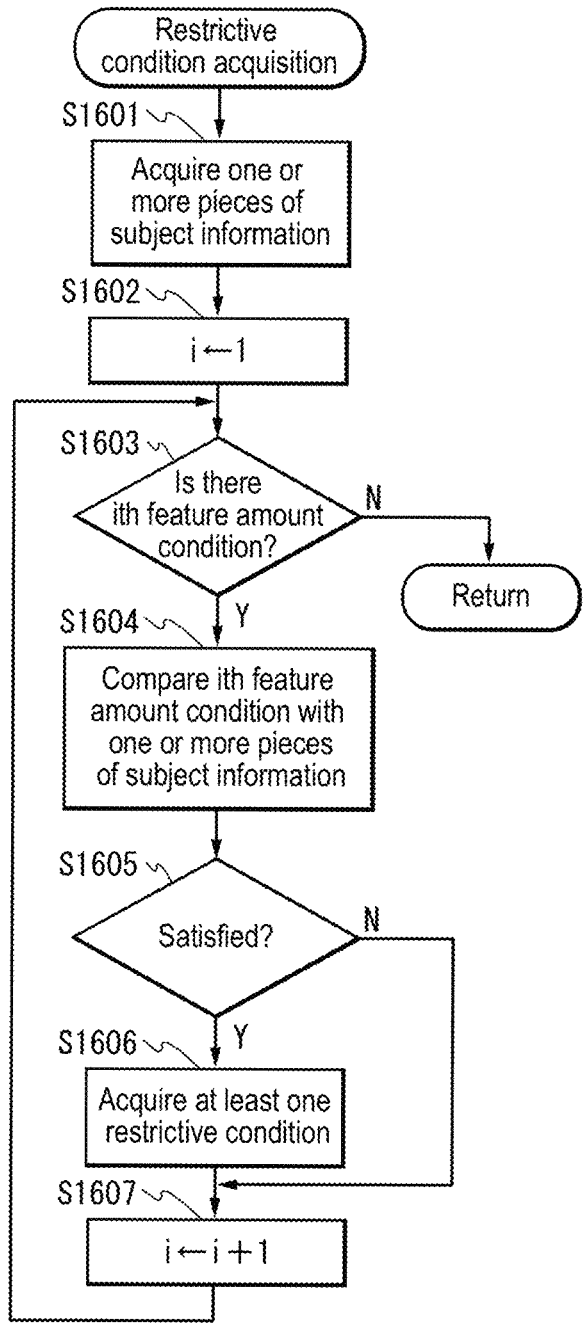
FIG. 16 is a flowchart illustrating restrictive condition selecting processing of the embodiment.

Hereinafter, the restrictive condition selecting processing of step S1501 will be described with reference to the flowchart of FIG. 16.

(Step S1601) The subject information acquiring unit 51 acquires one or more pieces of subject information.

(Step S1602) The restrictive condition acquiring unit 52 substitutes 1 for a counter i.

(Step S1603) The restrictive condition acquiring unit 52 judges whether or not there is an ith feature amount condition in the restrictive condition storage unit 31. If there is an ith feature amount condition, the procedure advances to step S1604, and otherwise, the procedure returns to the previous process.

(Step S1604) The restrictive condition acquiring unit 52 compares the ith feature amount condition with the one or more pieces of subject information obtained in step S1601.

(Step S1605) The restrictive condition acquiring unit 52 judges, as a result of the comparison in step S1604, whether or not the one or more pieces of subject information satisfy the ith feature amount condition. If the one or more pieces of subject information satisfy the ith feature amount condition, the procedure advances to step S1606, and otherwise, to step S1607.

(Step S1606) The restrictive condition acquiring unit 52 acquires, from the restrictive condition storage unit 31, at least one restrictive condition that constitutes a pair with the ith feature amount condition.

(Step S1607) The restrictive condition acquiring unit 52 increments the counter i by 1. The procedure returns to step S1603.

As described above, according to the present embodiment, it is possible to output an image that is balanced over an entire screen or on the whole image. More specifically, it is possible to output an image that satisfies a restrictive condition appropriate for the obtained subject information, allowing a viewer to feel a sense of perspective, a sense of depth, and the like that are needed to perceive the image as it really is.

Note that, in the present embodiment, the image processing apparatus 5 may have a configuration in which no image processing unit 41 is provided.

Furthermore, the software that realizes the image processing apparatus according to the present embodiment is the following sort of program. That is, this program is a program for causing a computer to function as: an accepting unit that accepts an image that is obtained by shooting a subject and has at least one field; a subject information acquiring unit that acquires one or more pieces of subject information; a restrictive condition acquiring unit that acquires at least one restrictive condition using the one or more pieces of subject information acquired by the subject information acquiring unit; an image changing unit that applies the at least one restrictive condition acquired by the restrictive condition acquiring unit to the at least one field of the image accepted by the accepting unit, changes the at least one field so that the at least one field satisfies the at least one restrictive condition, and acquires at least one new field; and an image output unit that outputs the at least one field acquired by the image changing unit.

Figure 17:
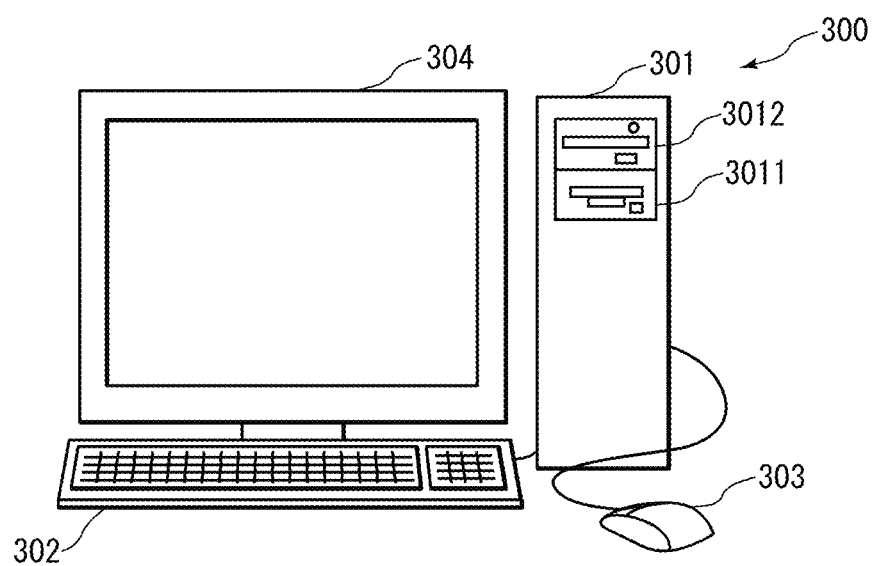
FIG. 17 is a schematic view of a computer system according to the foregoing embodiments.

Furthermore, FIG. 17 shows the external appearance of a computer that executes the programs described in the present specification to realize the image processing apparatuses in the foregoing embodiments. The foregoing embodiments may be realized using computer hardware and a computer program executed thereon. FIG. 17 is a schematic view of this computer system 300, and FIG. 18 is a block diagram of the computer system 300.

In FIG. 17, the computer system 300 includes a computer 301 including an FD drive and a CD-ROM drive, a keyboard 302, a mouse 303, a monitor 304, an FD drive 3011, and a CD-ROM drive 3012.

Figure 18:
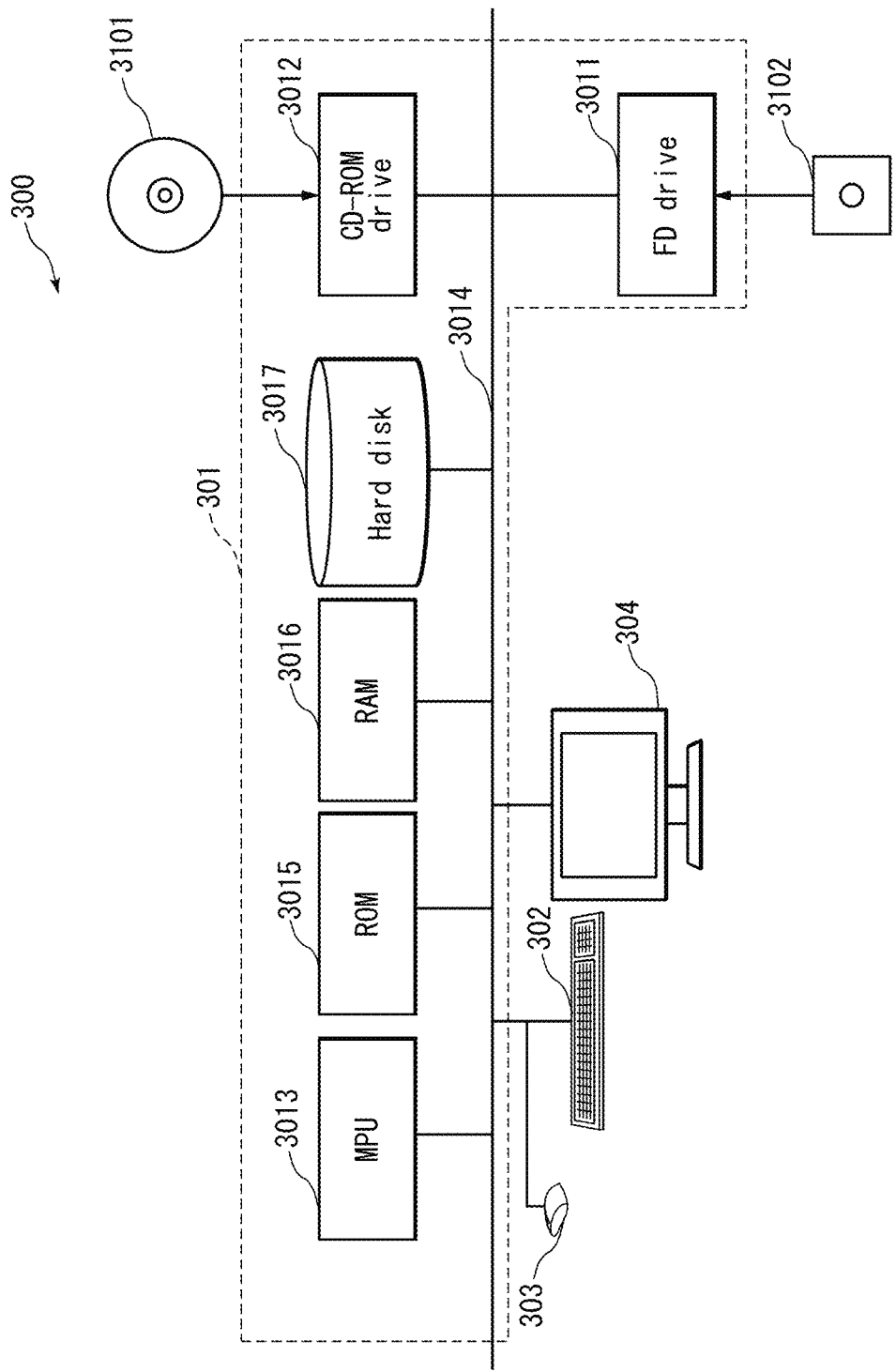
FIG. 18 is a block diagram of the computer system according to the foregoing embodiments.

In FIG. 18, the computer 301 includes, in addition to the constituent components of FIG. 17, an MPU 3013, a bus 3014 that is connected to the CD-ROM drive 3012 and the FD drive 3011, a ROM 3015 in which a program such as a boot up program is to be stored, a RAM 3016 that is connected to the MPU 3013, and in which a command of an application program is temporarily stored and a temporary storage area is to be provided, and a hard disk 3017 in which an application program, a system program, and data are to be stored. Although not shown here, the computer 301 may further include a network card that provides connection to a LAN.

The program for causing the computer system 300 to execute the functions of the image processing apparatus of the foregoing embodiments may be stored in a CD-ROM 3101 or an FD 3102, inserted into the CD-ROM drive 3012 or the FD drive 3011, and transmitted to the hard disk 3017. Alternatively, the program may be transmitted via a network (not shown) to the computer 301 and stored in the hard disk 3017. At the time of execution, the program is loaded into the RAM 3016. The program may also be loaded from the CD-ROM 3101 or the FD 3102, or directly from a network.

The program does not necessarily have to include, for example, an operating system (OS) or a third party program to cause the computer 301 to execute the functions of the image processing apparatus of the foregoing embodiments. The program may only include a command portion to call an appropriate function (module) in a controlled mode and obtain the desired results. The manner in which the computer system 300 operates is well known, and thus a detailed description thereof is omitted.

Note that, in the above-described program, the step or the like for receiving an image does not include processing performed by hardware, for example, processing (processing that is only performed by hardware) in the receiving step that is performed by a tuner, an interface card, or the like.

Furthermore, the computer that executes this program may be a single computer, or may be multiple computers. More specifically, centralized processing may be performed, or decentralized processing may be performed.

Furthermore, in the foregoing embodiments, each process (each function) may be realized by centralized processing using a single apparatus (system), or may be realized by decentralized processing using multiple apparatuses.

It will be appreciated that the present invention is not limited to the embodiments set forth herein, and various modifications are possible within the scope of the present invention.

INDUSTRIAL APPLICABILITY

As described above, the image processing apparatus according to the present invention has an effect that an image balanced on the whole can be output, and thus this apparatus is useful as a television receiver or the like.

LIST OF REFERENCE NUMERALS 1, 2, 3, 4, 5 Image processing apparatus
11, 31 Restrictive condition storage unit
12 Accepting unit
13, 33, 43 Image changing unit
14 Image output unit
21 Restrictive condition acquiring unit
41 Image processing unit
51 Subject information acquiring unit
52 Restrictive condition acquiring unit
331 Feature amount acquiring part
332 Restrictive condition acquiring part
333 Image acquiring part

The invention claimed is:

1. An image processing apparatus comprising:
a restrictive condition storage unit storing restrictive conditions to be applied to an image to be output;
a processor in communication with the restrictive condition storage unit, the processor configured to:
accept an image that is obtained by shooting a subject and has at least one field;
acquire at least one restrictive condition from the accepted image by:
acquiring values of all pixels of the at least one field;
performing regression analysis with respect to the values;
obtaining a regression surface based on the regression analysis;
determining an upper and lower threshold from the regression surface as the at least one restrictive condition;
instruct the restrictive condition storage unit to store the at least one restrictive condition;
change the at least one field based on the at least one restrictive condition so that the values of all pixels of the at least one field fall within a range between the upper and lower threshold; and
output the at least one field,
wherein at least two pairs of at least one restrictive condition and a feature amount condition, which relates to a feature amount of an object in the field, are stored in the restrictive condition storage unit, and
wherein the processor is configured to:
acquire at least one predetermined feature amount from the at east one field of the accepted image;
determine at least one feature amount condition that matches the at least one feature amount;
acquire, from the restrictive condition storage unit, at least one restrictive condition that constitutes a pair with each of the at least one feature amount condition;
apply the at least one restrictive condition to the at least one field of the accepted image; and
change the at least one field so that the at least one field satisfies the at least one restrictive condition, and acquire at least one new field.

2. The image processing apparatus according to claim 1, wherein the processor is configured to:
acquire at least one piece of subject information;
acquire at least one restrictive condition using the at least one piece of subject information; and
instruct the restrictive condition storage unit to store the at least one restrictive condition.

3. The image processing apparatus according to claim 1, wherein the at least one restrictive condition stored in the restrictive condition storage unit at least includes a condition in which a pixel value of a pixel included in the field is set as a parameter.

4. The image processing apparatus according to claim 3, wherein the at least one restrictive condition stored in the restrictive condition storage unit at least includes a condition in which a spatial activity of pixel values of two or more pixels included in one field is set as a parameter, the spatial activity being a difference between the pixel values.

5. The image processing apparatus according to claim 1, wherein the at least one restrictive condition stored in the restrictive condition storage unit at least includes a condition in which a sense of resolution of an object in the field is set as a parameter.

6. The image processing apparatus according to claim 1, wherein each value of a pixel is associated with at least one of the following: pixel value, brightness and a sense of resolution from the accepted image.

7. An image processing method comprising:
accepting, by a processor, an image that is obtained by shooting the subject and has at least one field;
acquiring, by the processor, at least one restrictive condition from the accepted image by:

acquiring values of all pixels of the at least one field;
performing regression analysis with respect to the values;
obtaining a regression surface based on the regression analysis;
determining an upper and lower threshold from the regression surface as the at least one restrictive condition;
changing, by the processor, the at least one field based on the at least one restrictive condition so that the values of all pixels of the at least one field fall within a range between the upper and lower threshold; and
outputting the at least one field,
wherein at least two pairs of at least one restrictive condition and a feature amount condition, which relates to a feature amount of an object in the field, are stored in a restrictive condition storage unit, and
wherein the processor is configured to:
acquire at least one predetermined feature amount from the least one field of the accepted image;
determine at least one feature amount condition that matches the at least one feature amount;
acquire, from the restrictive condition storage unit, at least one restrictive condition that constitutes a pair with each of the at least one feature amount condition;
apply the at least one restrictive condition to the at least one field of the accepted image; and
change the at least one field so that the at least one field satisfies the at least one restrictive condition, and acquire at least one new field.

8. A non-transitory computer readable storage medium in which a program is stored, the program causing a computer to function as:
accepting an image that is obtained by shooting the subject and has at least one field;
acquiring at least one restrictive condition from the accepted image by:
acquiring values of all pixels of the at least one field;
performing regression analysis with respect to the values;
obtaining a regression surface based on the regression analysis;
determining an upper and lower threshold from the regression surface as the at least one restrictive condition;
changing the at least one field based on the at least one restrictive condition so that the values of all pixels of the at least one field fall within a range between the upper and lower threshold;
outputting the at least one field;
storing at least two pairs of at least one restrictive condition and a feature amount condition, which relates to a feature amount of an object in the field, in a restrictive condition storage unit;
acquiring at least one predetermined feature amount from the at least one field of the accepted image;
determining at least one feature amount condition that matches the at least one feature amount;
acquiring, from the restrictive condition storage unit, at least one restrictive condition that constitutes a pair with each of the at least one feature amount condition;
applying the at least one restrictive condition to the at least one field of the accepted image; and
changing the at least one field so that the at least one field satisfies the at least one restrictive condition, and acquire at least one new field.

9. An image processing apparatus comprising:
a restrictive condition storage unit storing restrictive conditions to be applied to an image to be output;
a processor in communication with the restrictive condition storage unit, the processor configured to:
accept an image that is obtained by shooting a subject and has at least one field;
acquire at least one restrictive condition from the accepted image by:
acquiring values of all pixels of the at least one field;
performing regression analysis with respect to the values;
obtaining a regression surface based on the regression analysis;
determining an upper and lower threshold from the regression surface as the at least one restrictive condition;
instruct the restrictive condition storage unit to store the at least one restrictive condition;
change the at least one field based on the at least one restrictive condition so that the values of all pixels of the at least one field fall within a range between the upper and lower threshold; and
output the at least one field,
wherein the at least one restrictive condition stored in the restrictive condition storage unit at least includes a condition in which a pixel value of a pixel included in the field is set as a parameter,
wherein the at least one restrictive condition stored in the restrictive condition storage unit at least includes a condition in which a temporal activity of pixel values of pixels included in two or more fields that are temporally continuous is set as a parameter, the temporal activity being an amount of a change in the pixel values.

10. An image processing apparatus comprising:
a restrictive condition storage unit storing restrictive conditions to be applied to an image to be output;
a processor in communication with the restrictive condition storage unit, the processor configured to:
accept an image that is obtained by shooting a subject and has at least one field;
acquire at least one restrictive condition from the accepted image by:
acquiring values of all pixels of the at least one field;
performing regression analysis with respect to the values;
obtaining a regression surface based on the regression analysis;
determining an upper and lower threshold from the regression surface as the at least one restrictive condition;
instruct the restrictive condition storage unit to store the at least one restrictive condition;
change the at least one field based on the at least one restrictive condition so that the values of all pixels of the at least one field fall within a range between the upper and lower threshold; and
output the at least one field,
wherein the at least one restrictive condition stored in the restrictive condition storage unit at least includes a condition in which a sense of resolution of an object in the field is set as a parameter,
wherein the at least one restrictive condition stored in the restrictive condition storage unit at least includes a condition in which a temporal activity of senses of resolution of objects in two or more fields that are temporally continuous is set as a parameter, the temporal activity being an amount of a change in the senses of resolution.

11. An image processing apparatus comprising:
a restrictive condition storage unit storing restrictive conditions to be applied to an image to be output;
a processor in communication with the restrictive condition storage unit, the processor configured to:
 accept an image that is obtained by shooting a subject and has at least one field;
 acquire at least one restrictive condition from the accepted image by:
  acquiring values of all pixels of the at least one field;
  performing regression analysis with respect to the values;
  obtaining a regression surface based on the regression analysis;
  determining an upper and lower threshold from the regression surface as the at least one restrictive condition;
 instruct the restrictive condition storage unit to store the at least one restrictive condition;
 change the at least one field based on the at least one restrictive condition so that the values of all pixels of the at least one field fall within a range between the upper and lower threshold; and
 output the at least one field,
wherein the at least one restrictive condition stored in the restrictive condition storage unit at least includes a condition in which a sense of resolution of an object in the field is set as a parameter,
wherein the at least one restrictive condition stored in the restrictive condition storage unit at least includes a condition in which a spatial activity of senses of resolution of two or more objects included in one field is set as a parameter, the spatial activity being a difference between the senses of resolution.

* * * * *